United States Patent
Kogure et al.

(10) Patent No.: US 10,259,405 B2
(45) Date of Patent: Apr. 16, 2019

(54) WIRE RESTRICTING MEMBER, CYLINDRICAL STRUCTURE, ROUTING STRUCTURE, AND METHOD OF MANUFACTURING CYLINDRICAL STRUCTURE

(71) Applicant: Yazaki Corporation, Minato-ku, Tokyo (JP)

(72) Inventors: Naoto Kogure, Susono (JP); Kosuke Tomosada, Susono (JP); Tsukasa Sekino, Makinohara (JP); Hiroshi Yamashita, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/959,511

(22) Filed: Apr. 23, 2018

(65) Prior Publication Data

US 2018/0312120 A1    Nov. 1, 2018

(30) Foreign Application Priority Data

Apr. 28, 2017  (JP) ................................ 2017-090301

(51) Int. Cl.
| | |
|---|---|
| *B60R 16/02* | (2006.01) |
| *B60K 6/26* | (2007.10) |
| *H01B 7/20* | (2006.01) |
| *H02G 3/04* | (2006.01) |
| *H01B 7/24* | (2006.01) |

(52) U.S. Cl.
CPC ............ *B60R 16/0222* (2013.01); *B60K 6/26* (2013.01); *H01B 7/202* (2013.01); *H01B 7/24* (2013.01); *H02G 3/0475* (2013.01); *H02G 3/0481* (2013.01)

(58) Field of Classification Search
None
See application file for complete search history.

(56) References Cited

U.S. PATENT DOCUMENTS

| | | | | |
|---|---|---|---|---|
| 6,900,385 | B1 * | 5/2005 | Hsu ...................... | H02G 3/0462 |
| | | | | 174/36 |
| 7,718,894 | B2 * | 5/2010 | Blase .................. | H02G 11/006 |
| | | | | 174/481 |
| 8,070,212 | B2 * | 12/2011 | Shima ................. | B60R 16/0207 |
| | | | | 296/146.9 |

(Continued)

FOREIGN PATENT DOCUMENTS

| | | |
|---|---|---|
| JP | 5085943 B2 | 11/2012 |
| JP | 2015-077056 A | 4/2015 |

(Continued)

*Primary Examiner* — Dimary S Lopez Cruz
(74) *Attorney, Agent, or Firm* — Banner & Witcoff, Ltd.

(57) ABSTRACT

A wire restricting member includes a bottom plate portion and a pair of side plate portions. The pair of side plate portions vertically extend from opposite ends of the bottom plate portion along a longitudinal direction of the bottom plate portion, respectively. Upper ends of the pair of the side plate portions in a direction in which the pair of the side plate portions vertically extend are distant from each other to form an opening therebetween. Each of the pair of the side plate portions includes a notch which is cut from each of the upper ends to the bottom plate portion.

6 Claims, 19 Drawing Sheets

(56) References Cited

U.S. PATENT DOCUMENTS

| | | | |
|---|---|---|---|
| 8,648,259 B2* | 2/2014 | Gniewek | H02G 3/0468 16/2.1 |
| 8,957,310 B2* | 2/2015 | Kaihotsu | H02G 3/0475 174/68.3 |
| 9,531,173 B2* | 12/2016 | Masuda | B60R 16/0215 |
| 9,663,046 B2 | 5/2017 | Yoshida et al. | |
| 2016/0185308 A1 | 6/2016 | Sekino et al. | |
| 2016/0218496 A1* | 7/2016 | Terada | B60R 16/027 |
| 2016/0322796 A1* | 11/2016 | Sugimoto | H02G 3/0468 |
| 2016/0325699 A1 | 11/2016 | Yoshida et al. | |
| 2017/0217387 A1 | 8/2017 | Kogure | |
| 2017/0297514 A1* | 10/2017 | Sekino | B60R 16/0215 |

FOREIGN PATENT DOCUMENTS

| | | | |
|---|---|---|---|
| JP | 2015-156331 A | 8/2015 | |
| JP | 2016-086552 A | 5/2016 | |

\* cited by examiner

WIRE RESTRICTING MEMBER, CYLINDRICAL STRUCTURE, ROUTING STRUCTURE, AND METHOD OF MANUFACTURING CYLINDRICAL STRUCTURE

CROSS REFERENCE TO RELATED APPLICATIONS

This application is based on Japanese Patent Application (No. 2017-090301) filed on Apr. 28, 2017, the contents of which are incorporated herein by way of reference.

BACKGROUND

The present invention relates to a wire restricting member that restricts bending of electric wire, a cylindrical structure including the wire restricting member, a routing structure including the cylindrical structure, and a method of manufacturing the cylindrical structure.

Japanese Patent No. 5085943 and JP-A-2016-86552 disclose a wiring harness that is routed in a vehicle, the wiring harness being routed between a vehicle body and a sliding door that can slide relative to the vehicle body on a doorway of the vehicle body.

SUMMARY

An advantageous aspect according to one embodiment of the present invention is to provide a wire restricting member having versatility in restricting a bending direction of electric wire, a cylindrical structure including the wire restricting member, a routing structure including the cylindrical structure, and a method of manufacturing the cylindrical structure.

According to one advantageous aspect of the present invention, there is provided a wire restricting member including:
  a bottom plate portion; and
  a pair of side plate portions which vertically extend from opposite ends of the bottom plate portion along a longitudinal direction of the bottom plate portion, respectively, wherein
  upper ends of the side plate portions in a direction in which the side plate portions vertically extend are distant from each other to form an opening therebetween, and
  each of the side plate portions includes a notch which is cut from each of the upper ends to the bottom plate portion.

There may be provided a cylindrical structure including:
  the wire restricting member; and
  a cylindrical member which accommodates a part of the wire restricting member, wherein
  one end portion of the wire restricting member in a longitudinal direction and one end portion of the cylindrical member in the longitudinal direction are fixed to each other,
  the one end portion of the wire restricting member is disposed at outside of the cylindrical member, and
  the one end portion of the cylindrical member is positioned on a side where the one end portion of the wire restricting member is disposed.

The cylindrical structure may further include:
  a fixing member which fixes the one end portion of the wire restricting member and accommodates the one end portion of the wire restricting member and the one end portion of the cylindrical member therein.

The cylindrical structure may be configured such that:
  a first joint portion, which is a concave or a convex, is formed on an outer surface of either the bottom plate portion or the side plate portions in the one end portion of the wire restricting member, and
  a second joint portion, which is a convex or a concave, is formed at a position corresponding to the first joint portion in an inner surface of the fixing member that faces the outer surface of the one end portion of the wire restricting member.

The cylindrical structure may be configured such that:
  two first joint portions, each of which is a concave or a convex, are formed on an outer surface of the wire restricting member in the one end portion of the wire restricting member,
  the fixing member includes a first half body and a second half body, and is formed with two second joint portions each of which is a concave or a convex,
  one of the second joint portions is formed at a position corresponding to one of the first joint portions in an inner surface of the first half body that faces the outer surface of the one end portion of the wire restricting member, and
  the other one of the second joint portions is formed at a position corresponding to the other one of the first joint portions in an inner surface of the second half body that faces the outer surface of the one end portion of the wire restricting member.

There may be provided a routing structure including:
  the cylindrical structure; and
  an assembly member configured to assemble the cylindrical structure to a vehicle body, wherein
  the fixing member includes a fixing member main body and a projection portion formed on an outer surface of the fixing member main body,
  the fixing member main body accommodates the one end portion of the wire restricting member and the one end portion of the cylindrical member,
  the outer surface of the fixing member main body is formed in a spherical shape as a whole,
  the assembly member includes an assembly member main body and a groove portion,
  the assembly member main body has a spherical accommodation space that accommodates the fixing member main body,
  the groove portion, is bored on a surface of the assembly member main body facing the accommodation space, and extends along a circumferential direction that is perpendicular to a longitudinal direction of the cylindrical member extending from the fixing member main body, and
  the projection portion is fitted to the groove portion in a state where the fixing member main body is accommodated in the assembly member main body.

According to another advantageous aspect of the present invention, there is provided a method of manufacturing a cylindrical structure, including:
  inserting a wire restricting member into a cylindrical member, the wire restricting member including a bottom plate portion and a pair of side plate portions, the side plate portions which vertically extend from opposite ends of the bottom plate portion along a longitudinal direction of the bottom plate portion, respectively, and in which upper ends of the side plate portions in a direction in which the side plate portions vertically extend are distant from each other to form an opening therebetween, and each of the side plate portions including a notch which is cut from each of the upper ends to the bottom plate portion; and covering and fixing, by a fixing member, one end portion of the wire restricting member in the longitudinal direction and one end portion of the cylindrical member in the longitudinal direction, the one end portion of the wire restricting member being disposed at outside of the cylindrical member, and the one end portion of the cylindrical member being positioned on a side where the one end portion of the wire restricting member is disposed.

DETAILED DESCRIPTION OF EXEMPLIFIED EMBODIMENTS

Incidentally, JP-A-2015-77056 and JP-A-2015-156331 disclose a routing structure in which restriction is applied in a bending direction of a harness. In this harness routing structure of the related art, a mechanism for restricting bending is provided on an outer surface of an exterior material. However, in a case where this mechanism is provided on the outer surface of the exterior material, a routing environment where the exterior material can be provided varies depending on vehicles. Therefore, a vehicle in which an exterior material adopting a given mechanism can be used is limited. As a result, it is necessary to manufacture exterior materials according to routing environments that vary depending on vehicles, and thus there is a problem in that the number of exterior materials increases.

The present invention has been made in consideration of the above-described circumstances, and an object thereof is to provide a wire restricting member having versatility in restricting a bending direction of electric wire, a cylindrical structure including the wire restricting member, a routing structure including the cylindrical structure, and a method of manufacturing the cylindrical structure.

Figure 1:
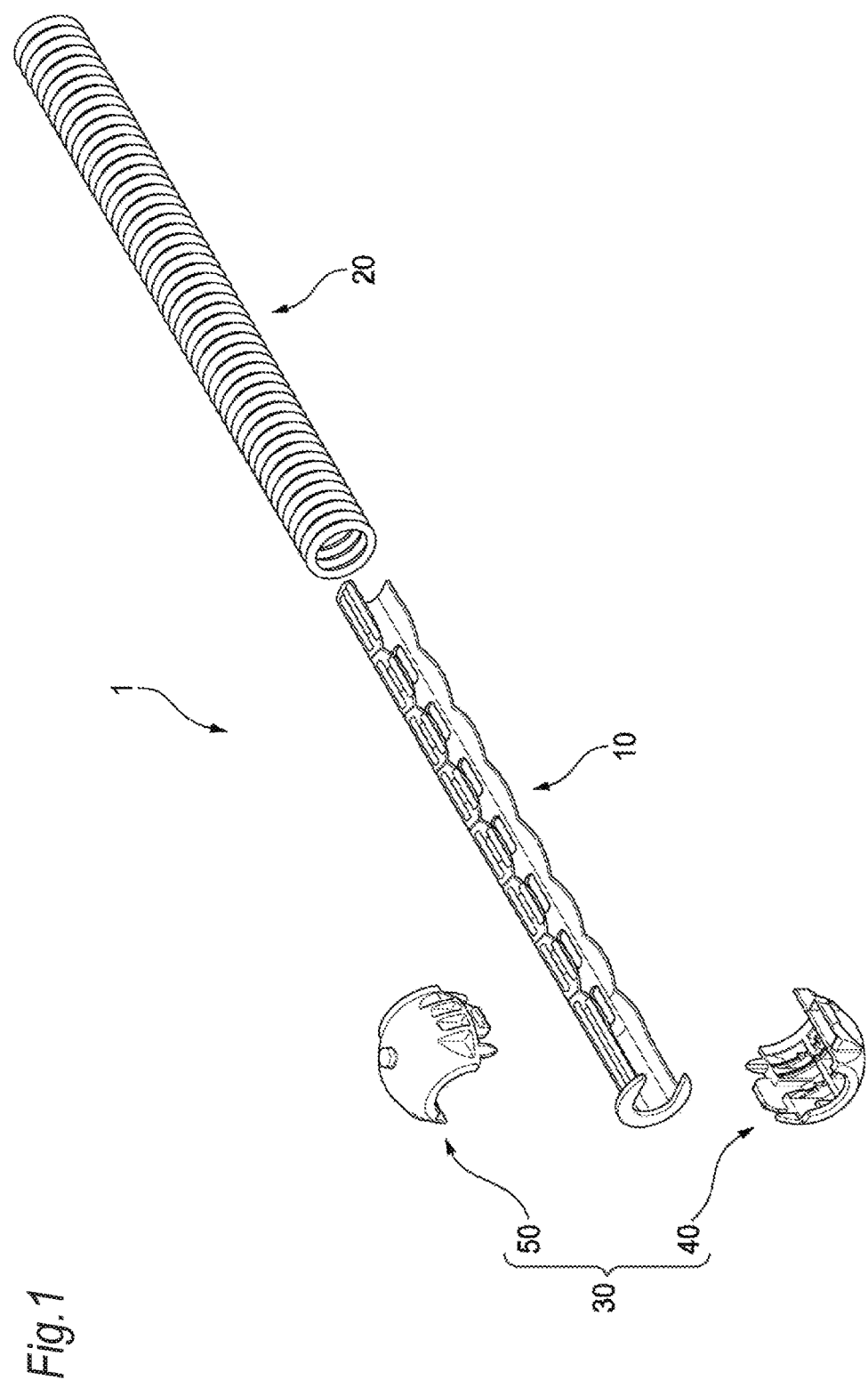
FIG. 1 is an exploded perspective view illustrating a cylindrical structure according to an embodiment of the invention.

Hereinafter, a specific embodiment according to the invention will be described with reference to the drawings. FIG. 1 is an exploded perspective view illustrating a cylindrical structure according to the embodiment of the invention.

As illustrated in FIG. 1, a cylindrical structure 1 according to the embodiment of the invention includes a wire restricting member 10, a cylindrical member 20, and a fixing member 30. Hereinafter, the wire restricting member 10, the cylindrical member 20, and the fixing member 30 will be described in detail.

Figure 2:
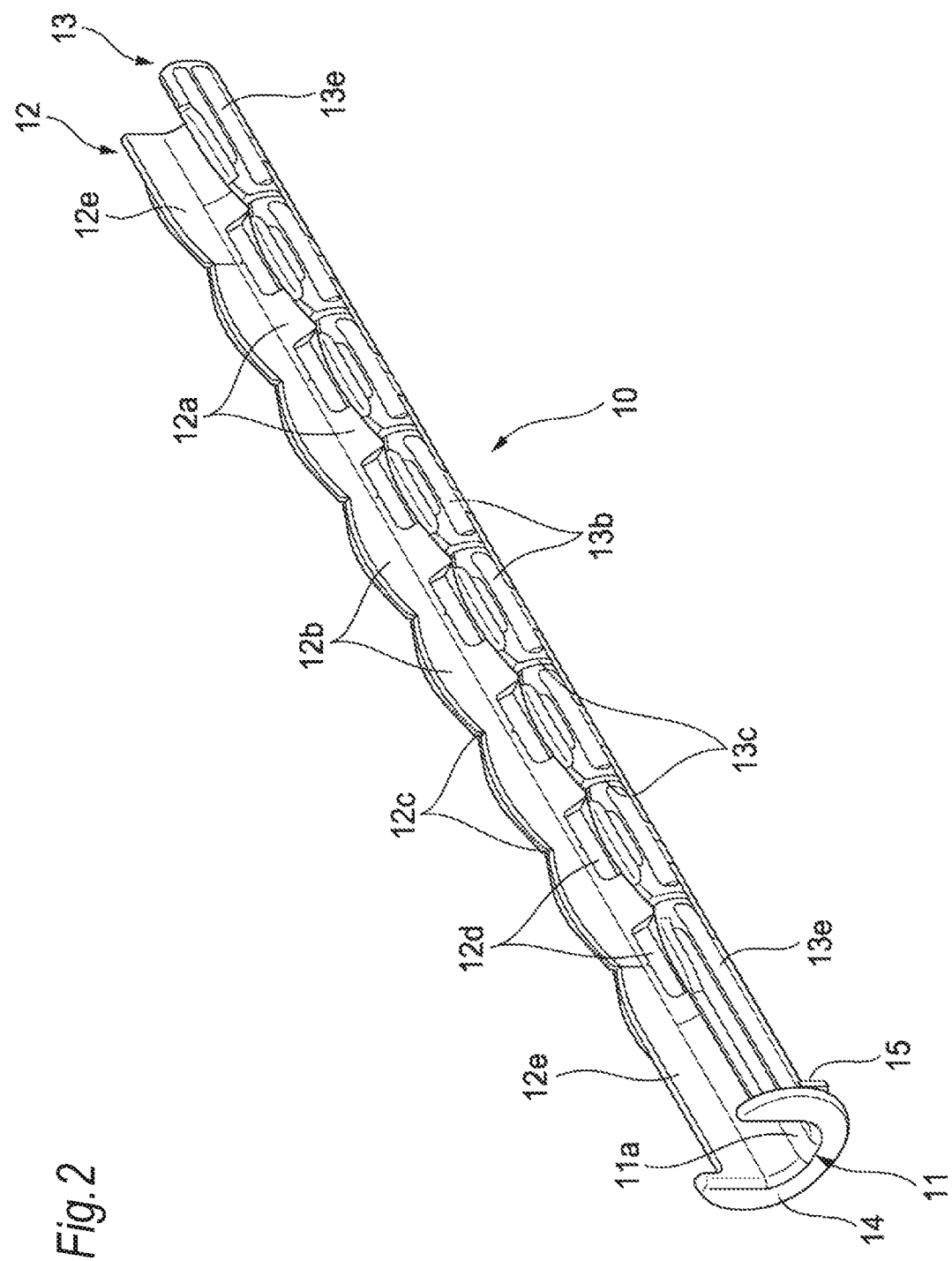
FIG. 2 is a perspective view illustrating a wire restricting member according to the embodiment of the invention.
Figure 3:
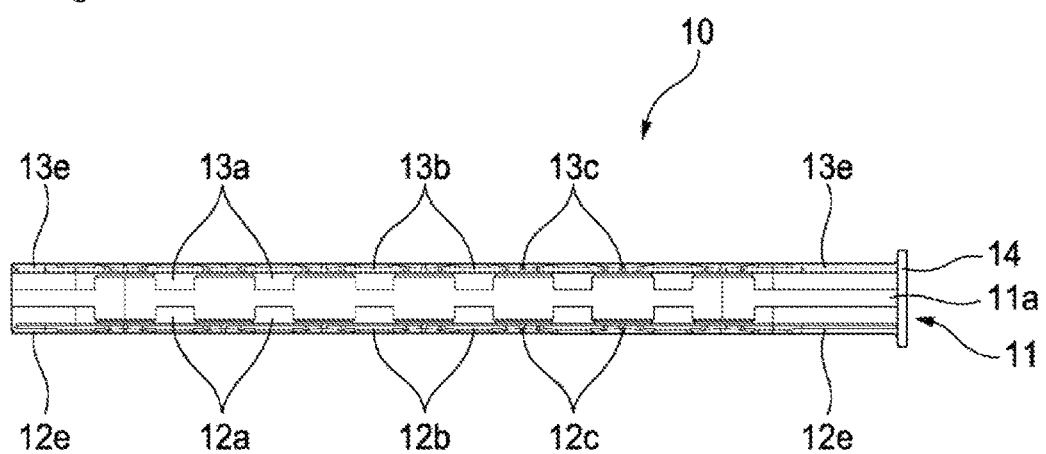
FIG. 3 is a plan view illustrating the wire restricting member according to the embodiment of the invention.
Figure 4:
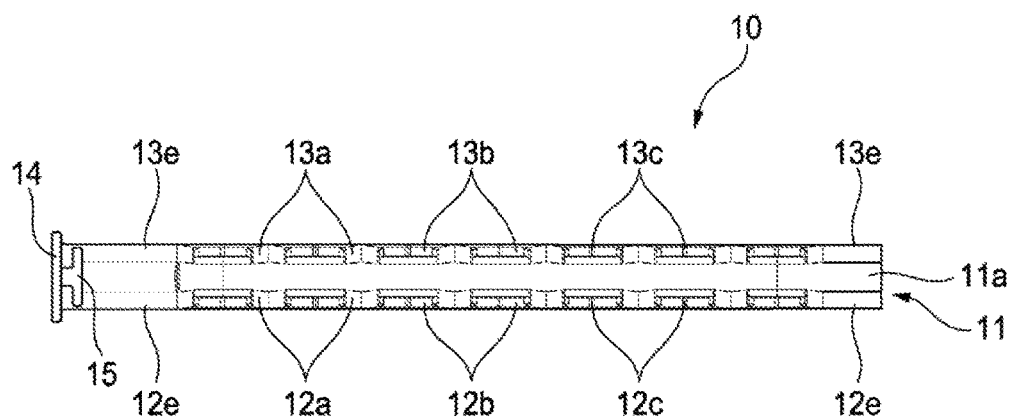
FIG. 4 is a bottom view illustrating the wire restricting member according to the embodiment of the invention.
Figure 5:
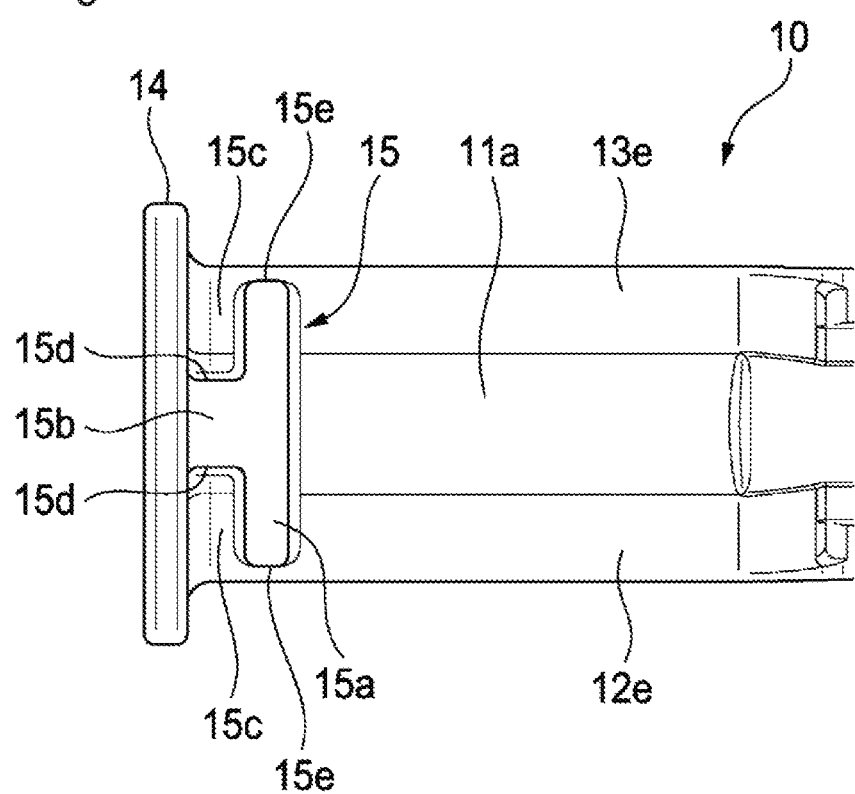
FIG. 5 is an enlarged view illustrating major components of FIG. 4.
Figure 6:
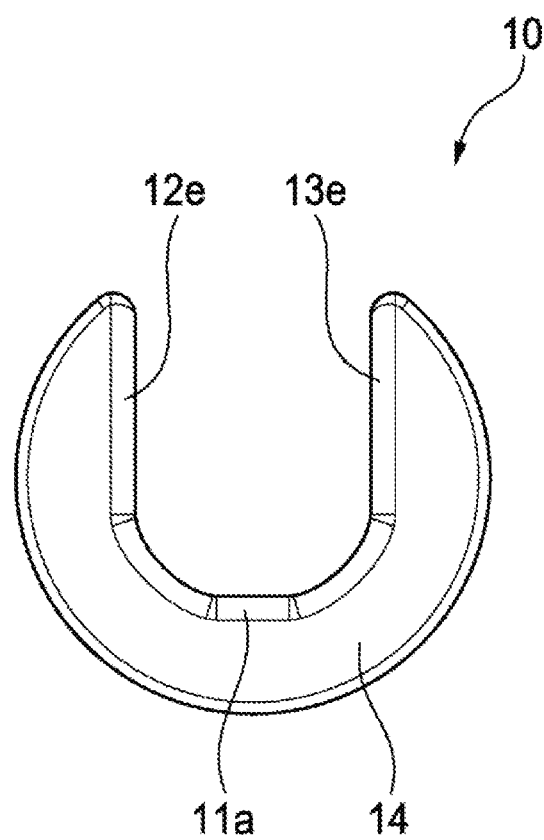
FIG. 6 is a front view illustrating the wire restricting member according to the embodiment of the invention.
Figure 7:
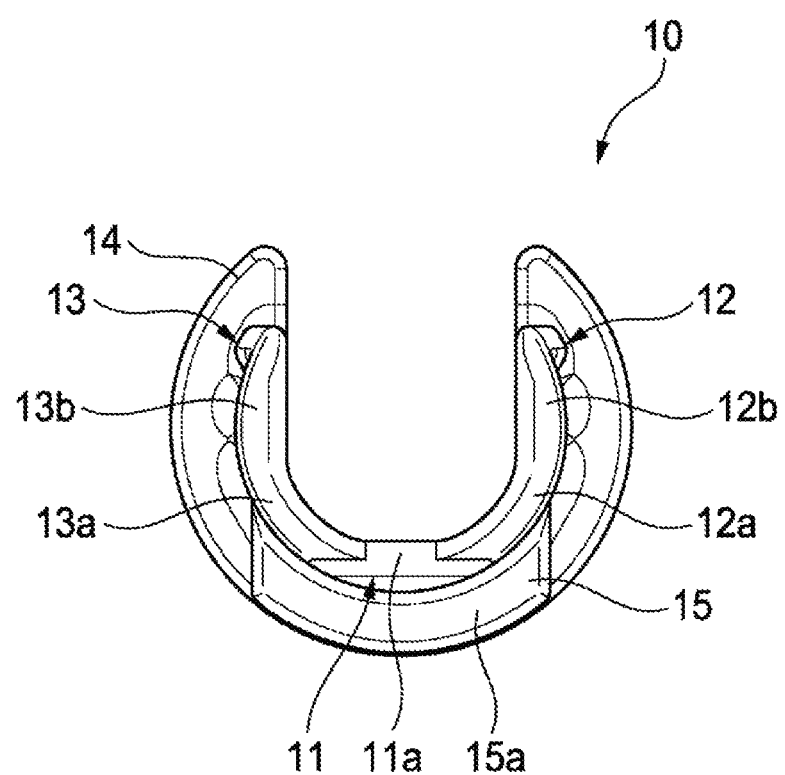
FIG. 7 is a rear view illustrating the wire restricting member according to the embodiment of the invention.
Figure 8:
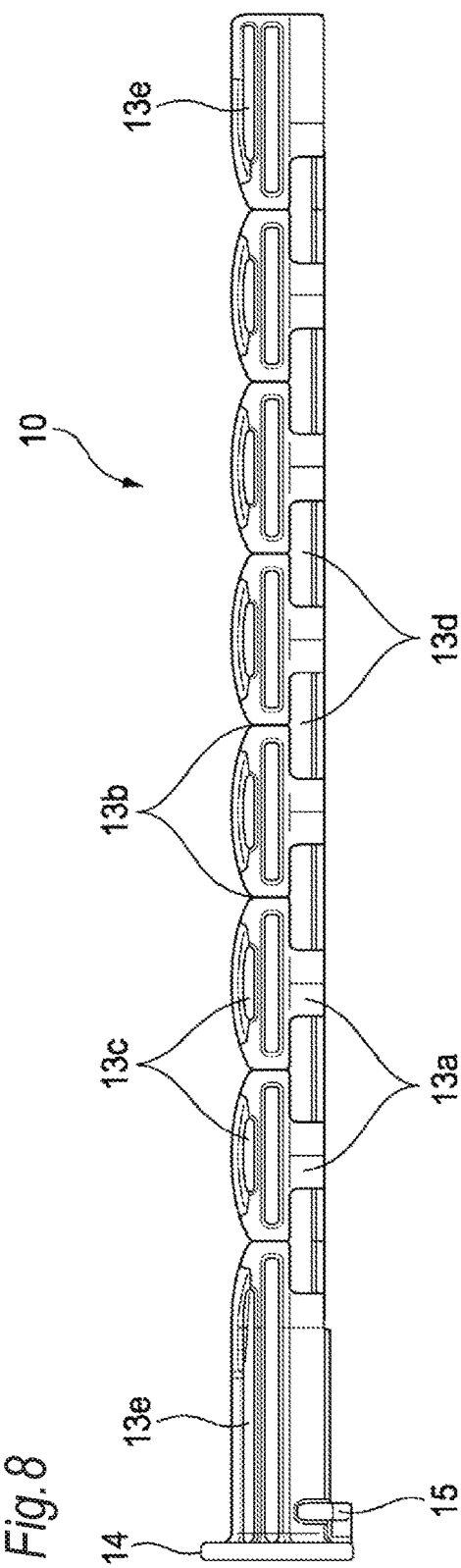
FIG. 8 is a side view illustrating the wire restricting member according to the embodiment of the invention.
Figure 9:
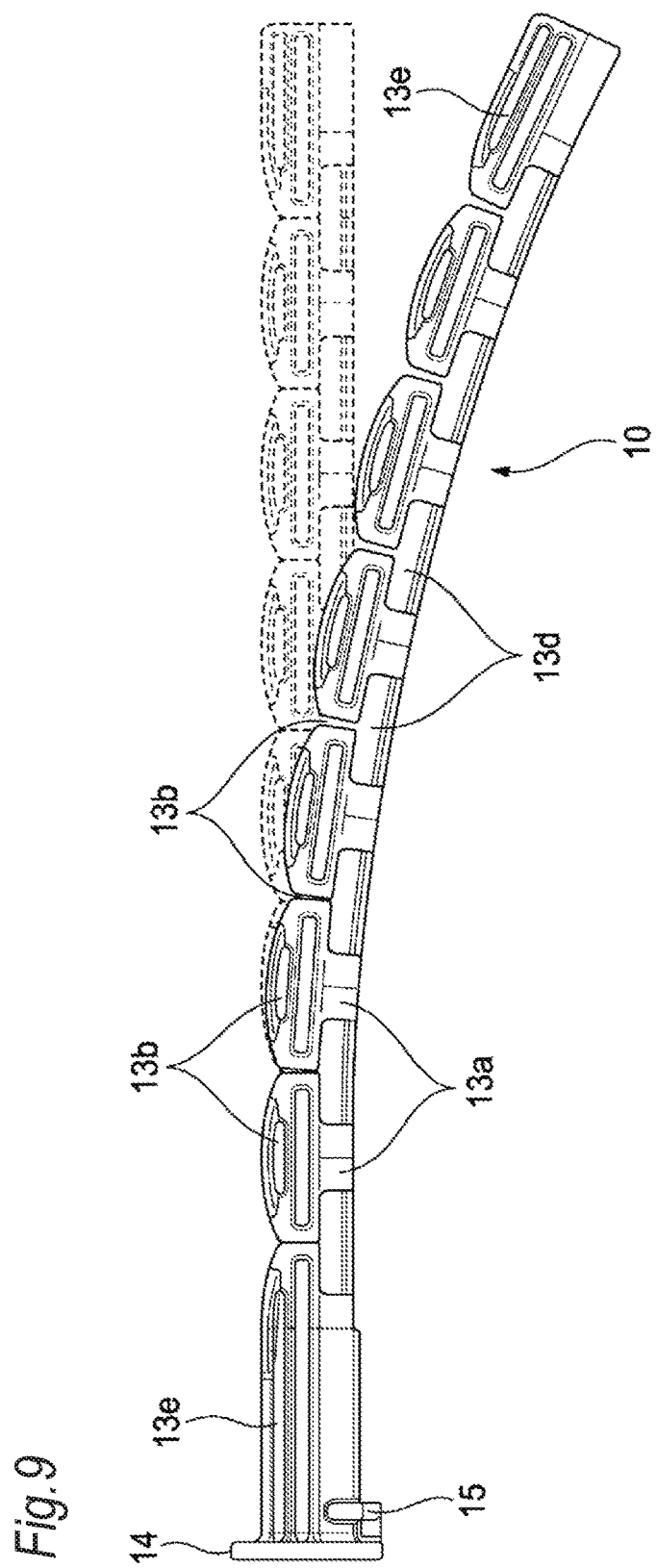
FIG. 9 is a side view illustrating a state where the wire restricting member according to the embodiment of the invention is bent.

First, the wire restricting member 10 will be described in detail. FIG. 2 is a perspective view illustrating the wire restricting member according to the embodiment of the invention. FIG. 3 is a plan view illustrating the wire restricting member according to the embodiment of the invention. FIG. 4 is a bottom view illustrating the wire restricting member according to the embodiment of the invention. FIG. 5 is an enlarged view illustrating major components of FIG. 4. FIG. 6 is a front view illustrating the wire restricting member according to the embodiment of the invention. FIG. 7 is a rear view illustrating the wire restricting member according to the embodiment of the invention. FIG. 8 is a side view illustrating the wire restricting member according to the embodiment of the invention. FIG. 9 is a side view illustrating a state where the wire restricting member according to the embodiment of the invention is bent.

As illustrated in FIG. 2, the wire restricting member 10 has a rod shape as a whole, a groove is formed along a longitudinal direction thereof, and a cross-section thereof has a U-shape. The wire restricting member 10 is formed in an upwardly opening gutter shape. The wire restricting member 10 restricts a bent state of electric wire by disposing the electric wire in the groove. The wire restricting member 10 having this function includes a bottom plate portion 11, a right side plate portion 12, a left side plate portion 13, a retaining piece 14, and a positioning rib 15.

As illustrated in FIGS. 2, 4, and 5, the bottom plate portion 11 is positioned in the bottom of the wire restricting member 10 having a U-shape in cross-section. The bottom plate portion 11 is formed by a strip-shaped bottom plate 11a extending in one direction. The right side plate portion 12 and the left side plate portion 13 are respectively connected to opposite ends of the bottom plate 11a positioned in a transverse direction of the bottom plate 11a. The right side plate portion 12 and the left side plate portion 13 connected to the bottom plate 11a are provided along a longitudinal direction of the bottom plate 11a.

As illustrated in FIGS. 2, 3, 7, and 8, the right side plate portion 12 and the left side plate portion 13 vertically extend from the opposite ends of the bottom plate portion 11, respectively. As illustrated in the rear view of FIG. 7, the right side plate portion 12 vertically extends upward from the right end of the bottom plate 11a positioned in the transverse direction. Specifically, the right side plate portion 12 extends upward from the right end of the bottom plate 11a through a curved piece 12a and a restricting piece 12b. The curved piece 12a vertically extends outward from the right end of the bottom plate 11a to be curved to form a convex arc, and the restricting piece 12b extends upward from a tip end of the curved piece 12a extending in an arc shape. Likewise, as illustrated in the rear view of FIG. 7, the left side plate portion 13 vertically extends upward from the left end of the bottom plate 11a positioned in the transverse direction. Specifically, the left side plate portion 13 vertically extends upward from the left end of the bottom plate 11a through a curved piece 13a and a restricting piece 13b. The curved piece 13a extends outward from the left end of the bottom plate 11a to be curved to form a convex arc, and the restricting piece 13b extends upward from a tip end of the curved piece 13a extending in an arc shape. In the right side plate portion 12 and the left side plate portion 13, upper ends of the restricting pieces 12b and 13b are distant from each other to form an opening. The bottom plate portion 11, the right side plate portion 12, and the left side plate portion 13 having the above-described configuration are formed in a U-shape in cross-section.

In addition, regarding the right side plate portion 12, as illustrated in FIG. 2, in the right end of the bottom plate 11a, six sets of curved pieces 12a and restricting pieces 12b are provided adjacent to each other along the longitudinal direction of the bottom plate 11a. Likewise, regarding the left side plate portion 13, as illustrated in FIGS. 2 and 8, in the left end of the bottom plate 11a, six sets of the curved pieces 13a and the restricting pieces 13b are provided adjacent to each other along the longitudinal direction of the bottom plate 11a. The respective restricting pieces 12b and 13b are adjacent to each other but are not connected to each other. A notch 12c is formed between adjacent restricting pieces 12b, and a notch 13c is formed between adjacent restricting pieces 13b. Regarding the restricting pieces 12b and 13b, in a case where the wire restricting member 10 is linear as illustrated in FIG. 8 without being affected by an external force, ends of adjacent restricting pieces 12b and 13b come into contact with each other. On the other hand, in a case where the wire restricting member 10 is bent as illustrated in FIG. 9 by being affected by an external force, ends of adjacent restricting pieces 12b and 13b become distant from each other.

In addition, in the right side plate portion 12, as illustrated in FIG. 2, a gap 12d is formed between adjacent curved pieces 12a. In adjacent two sets of curved pieces 12a and restricting pieces 12b, the gap 12d is a hole that is surrounded by an edge of the bottom plate 11a, facing edges of the two curved pieces 12a, and lower edges of the two restricting pieces 12b. Likewise, in the left side plate portion 13, as illustrated in FIGS. 2 and 8, a gap 13d is formed between adjacent curved pieces 13a. In adjacent two sets of curved pieces 13a and restricting pieces 13b, the gap 13d is a hole that is surrounded by an edge of the bottom plate 11a, facing edges of the two curved pieces 13a, and lower edges of the two restricting pieces 13b. By adjusting the areas of the gaps 12d and the 13d, in other words, by adjusting the dimensions of the curved pieces 12a and 13a in a width direction (the dimension of the bottom plate 11a in the longitudinal direction), the magnitude of an external force required to bent the wire restricting member 10 to some extent can be adjusted. In this way, in the right side plate portion 12 and the left side plate portion 13, notches are formed from the upper ends of the right side plate portion 12 and the left side plate portion 13 toward the bottom plate portion 11 by the notches 12c and 13c and the gaps 12d and the 13d.

In the right side plate portion 12, end pieces 12e are further provided at opposite ends of the six restricting pieces 12b in the longitudinal direction, respectively. The end piece 12e is longer than the dimension of the restricting piece 12b in the width direction (the dimension of the bottom plate 11a in the longitudinal direction) and is positioned at each of the opposite ends of the wire restricting member 10 in the longitudinal direction. The end piece 12e has a shape that is curved to form a convex arc from the right end of the bottom plate 11a to the outside and further extends upward. Likewise, in the left side plate portion 13, end pieces 13e are further provided at opposite ends of the six restricting pieces 13b in the longitudinal direction, respectively. The end piece 13e is longer than the dimension of the restricting piece 13b in the width direction (the dimension of the bottom plate 11a in the longitudinal direction) and is positioned at each of the opposite ends of the wire restricting member 10 in the longitudinal direction. The end piece 13e has a shape that is curved to form a convex arc from the left end of the bottom plate 11a to the outside and further extends upward.

As illustrated in FIGS. 2 and 5, the retaining piece 14 extends from one end of the end pieces 12e and 13e in a width direction toward a plane perpendicular to the longitudinal direction of the bottom plate 11a. As shown in FIG. 6, an outer circumferential edge of the retaining piece 14 has a substantially circular shape in a front view of the wire restricting member 10. When the wire restricting member 10 is fixed to the fixing member 30, even in a case where an external force is applied to the wire restricting member 10 in a direction in which the wire restricting member 10 is removed from the fixing member 30, the retaining piece 14 functions as a stopper that applies a reaction force against the external force.

As illustrated in FIGS. 5 and 7, the positioning rib 15 has a convex shape that is formed outside of the bottom plate 11a of the bottom plate portion 11, the end piece 12e of the right side plate portion 12, and the end piece 13e of the left side plate portion 13. The positioning rib 15 includes a circumferential projection 15a and a connecting projection 15b. The circumferential projection 15a has a shape that protrudes from outer surfaces of the bottom plate 11a, the end piece 12e, and the end piece 13e so as to go across the bottom plate 11a, the end piece 12e, and the end piece 13e around the longitudinal direction of the wire restricting member 10 as an axial center. The connecting projection 15b is positioned between the circumferential projection 15a and the retaining piece 14, is connected to the circumferential projection 15a and the retaining piece 14, and has a shape that protrudes from an outer surface of the bottom plate 11a. By forming the circumferential projection 15a and the connecting projection 15b to protrude from the bottom plate 11a, the end piece 12e, and the end piece 13e, a first joint portion 15c surrounded by the retaining piece 14, the circumferential projection 15a, and the connecting projection 15b is formed at two positions. In the present embodiment, the first joint portion 15c is a recess 15c. Among surfaces that define the recesses 15c, outer surfaces of the connecting projection 15b will be referred to as aligning surfaces 15d. In addition, outer surfaces of the circumferential projection 15a in a circumferential direction will be referred to as aligning surfaces 15e. As the details will be described below, when the wire restricting member 10 is fixed to the fixing member 30, the two recesses 15c function as positioning means for determining an axial position of the wire restricting member 10 relative to the fixing member 30.

Next, the cylindrical member 20 will be described. The cylindrical member 20 is a hollow cylindrical member. In the embodiment of the invention, a case where a corrugate tube is used as the cylindrical member 20 will be described as one form. The cylindrical member to which the invention is applied is not limited to a corrugate tube, and a member having a hollow cross-section such as a tube or a grommet can be applied. Since a shape of the cylindrical member is well-known, the detailed description thereof will not be made.

Figure 10:
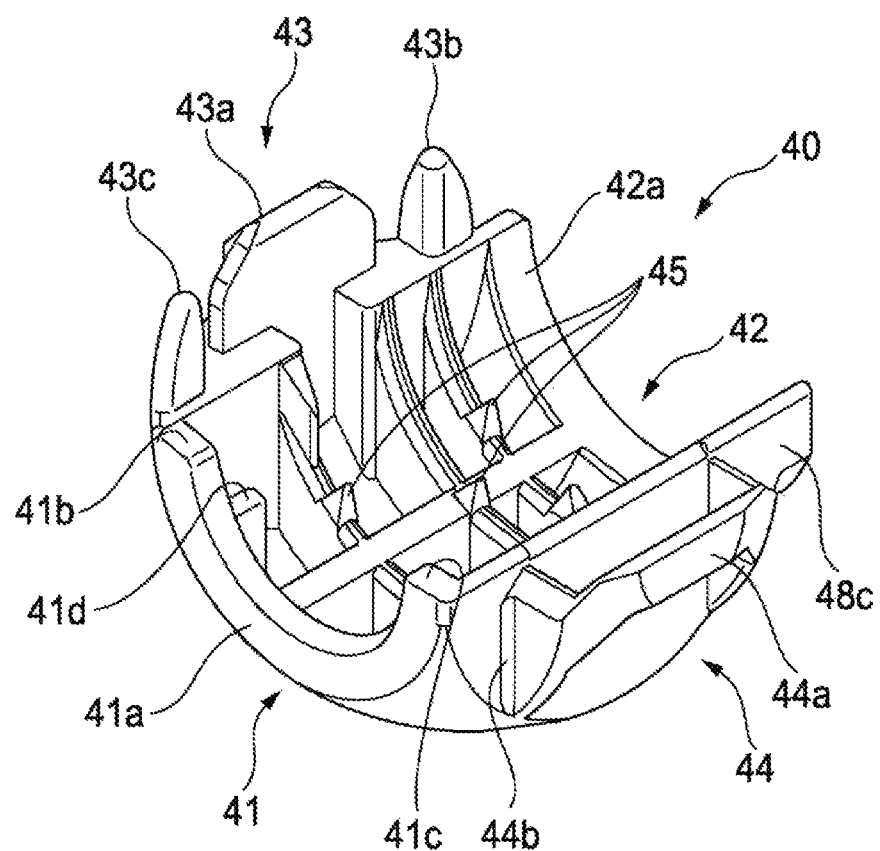
FIG. 10 is a perspective view illustrating a lower housing of a fixing member according to the embodiment of the invention.
Figure 11:
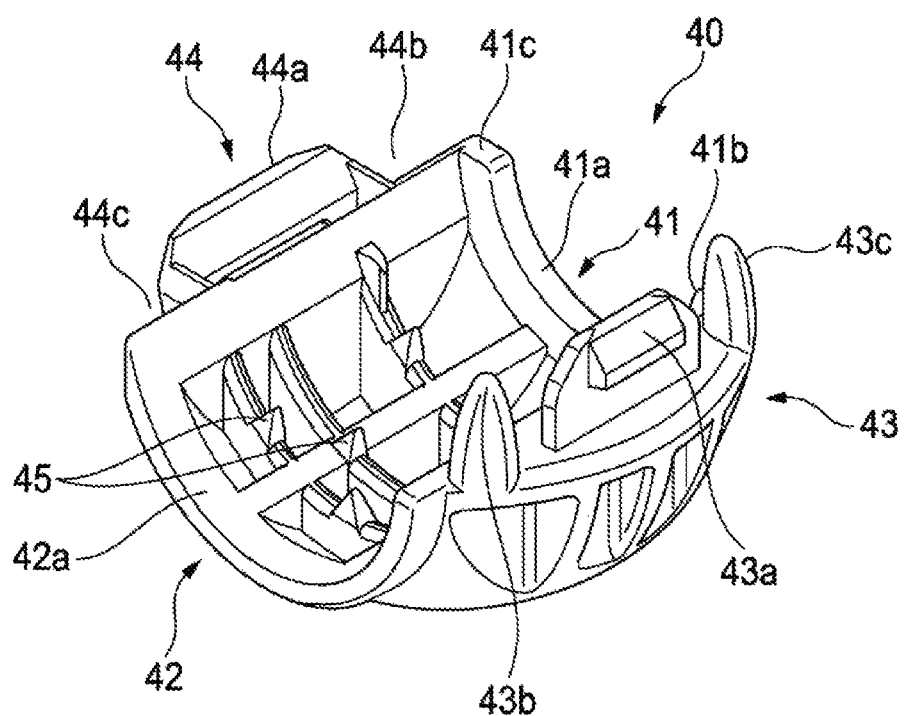
FIG. 11 is a perspective view illustrating the lower housing of the fixing member according to the embodiment of the invention when seen from a different direction from that of FIG. 10.
Figure 12:
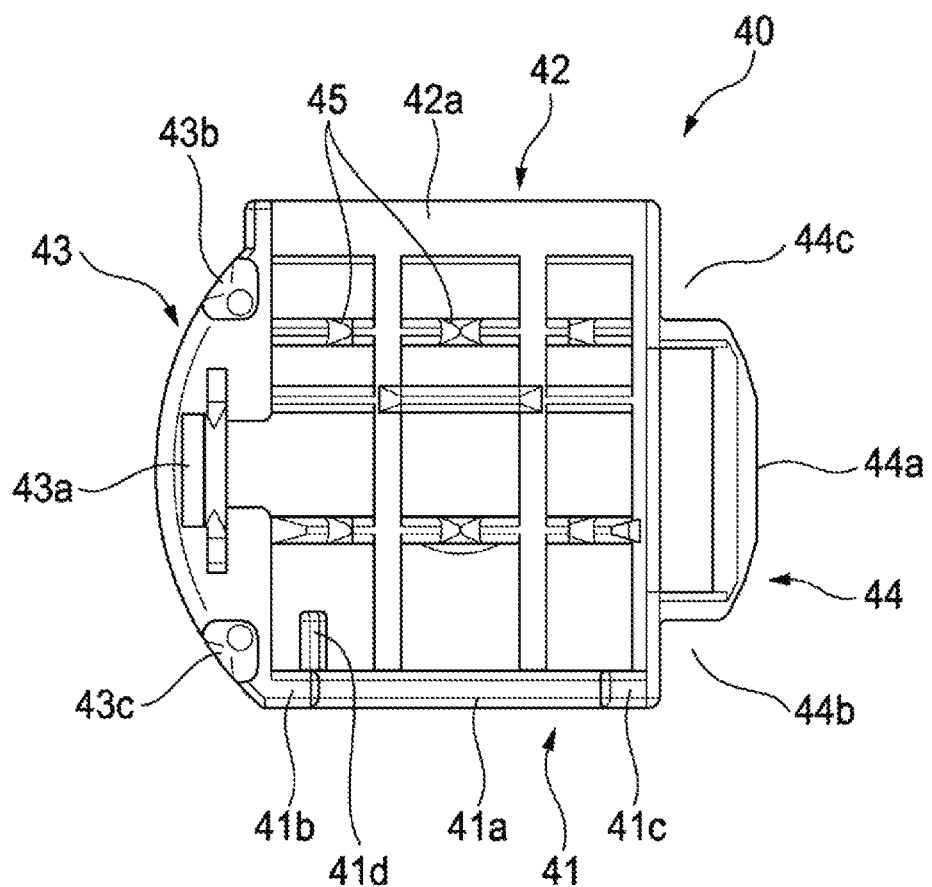
FIG. 12 is a plan view illustrating the lower housing of the fixing member according to the embodiment of the invention.
Figure 13:
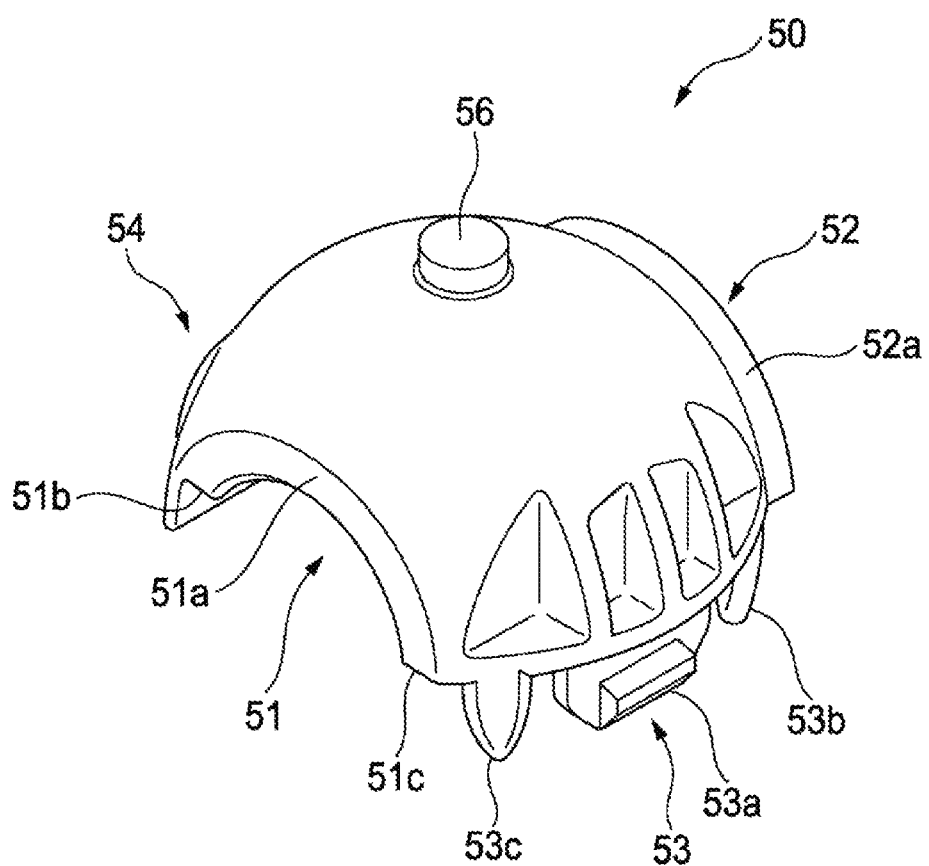
FIG. 13 is a perspective view illustrating an upper housing of the fixing member according to the embodiment of the invention.
Figure 14:
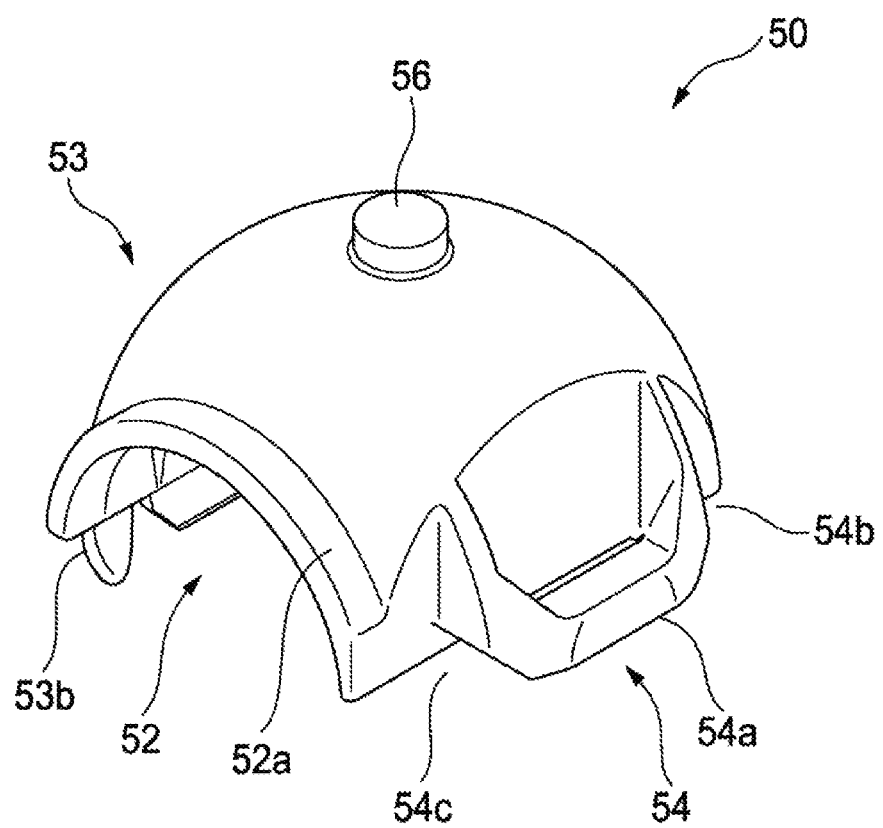
FIG. 14 is a perspective view illustrating the upper housing of the fixing member according to the embodiment of the invention when seen from a different direction from that of FIG. 13.
Figure 15:
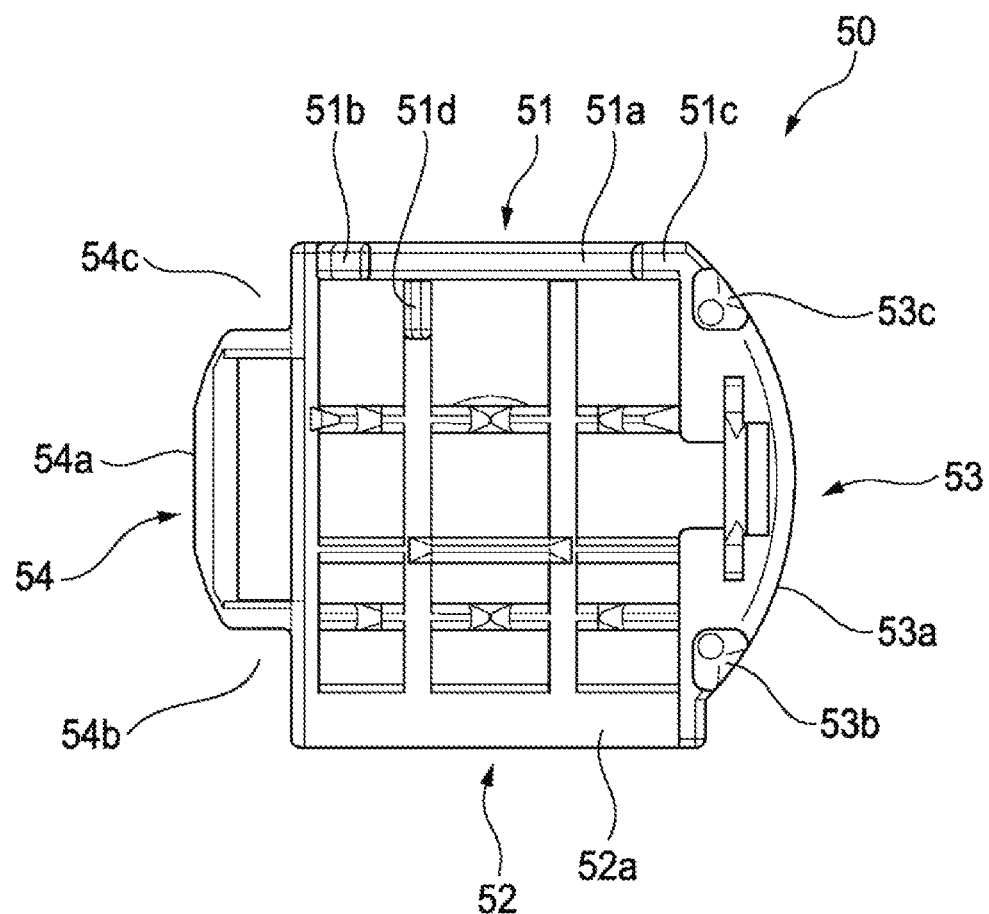
FIG. 15 is a bottom view illustrating the upper housing of the fixing member according to the embodiment of the invention.
Figure 16:
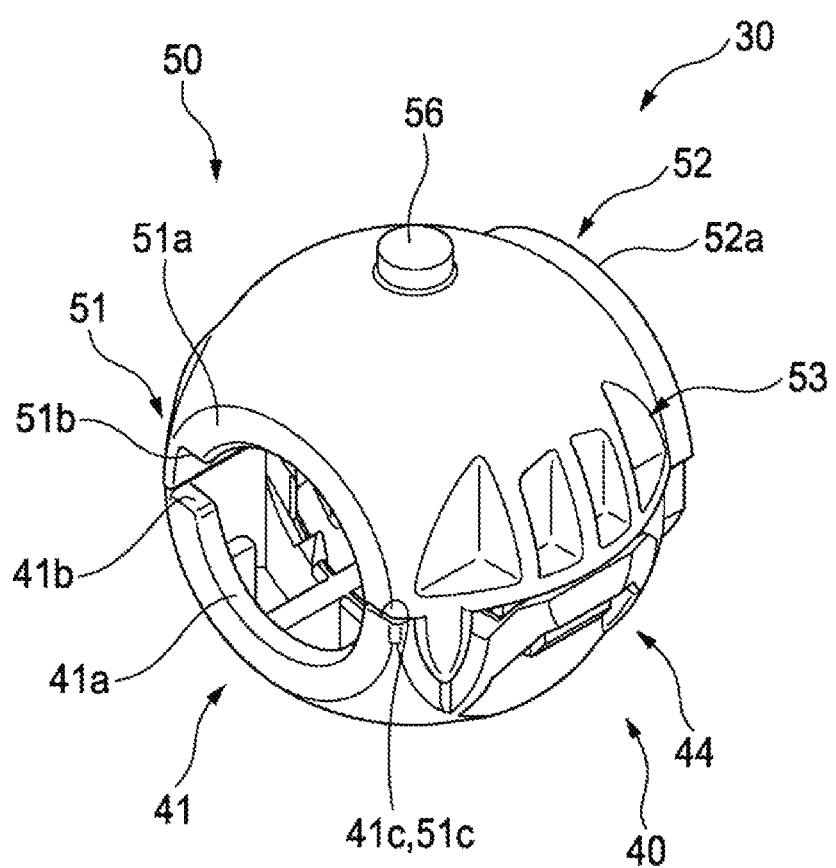
FIG. 16 is a perspective view illustrating the fixing member according to the embodiment of the invention in which the lower housing illustrated in FIG. 10 and the upper housing illustrated in FIG. 13 are assembled together.
Figure 17:
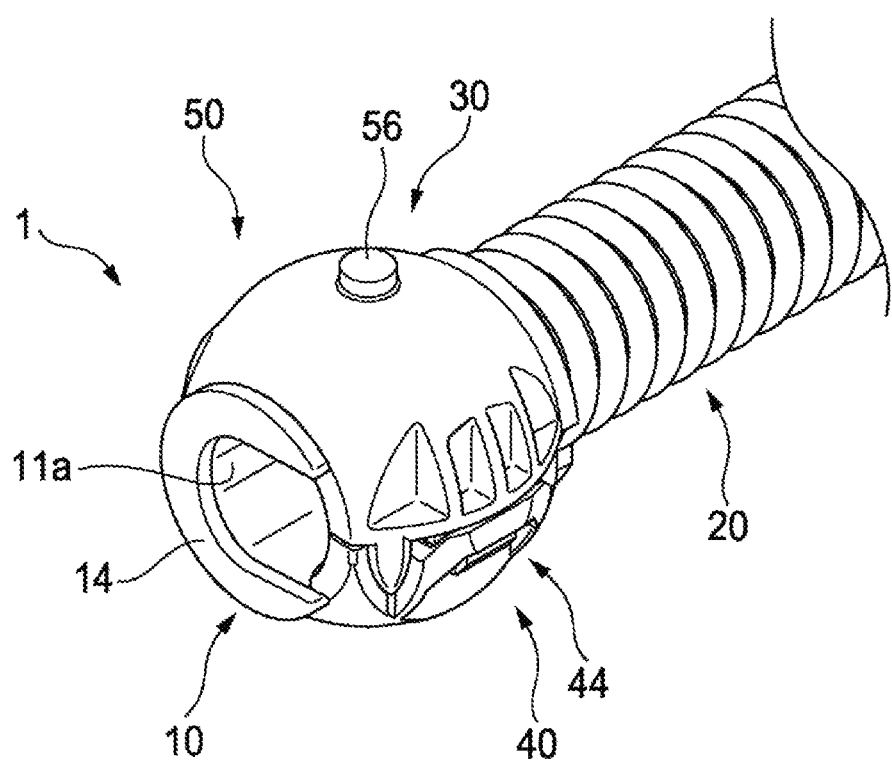
FIG. 17 is a perspective view illustrating the cylindrical structure according to the embodiment of the invention.

Next, the fixing member 30 will be described. FIG. 10 is a perspective view illustrating a lower housing of the fixing member according to the embodiment of the invention. FIG. 11 is a perspective view illustrating the lower housing of the fixing member according to the embodiment of the invention when seen from a different direction from that of FIG. 10. FIG. 12 is a plan view illustrating the lower housing of the fixing member according to the embodiment of the invention. FIG. 13 is a perspective view illustrating an upper housing of the fixing member according to the embodiment of the invention. FIG. 14 is a perspective view illustrating the upper housing of the fixing member according to the embodiment of the invention when seen from a different direction from that of FIG. 13. FIG. 15 is a bottom view illustrating the upper housing of the fixing member according to the embodiment of the invention. FIG. 16 is a perspective view illustrating the fixing member according to the embodiment of the invention in which the lower housing illustrated in FIG. 10 and the upper housing illustrated in FIG. 13 are assembled together. FIG. 17 is a perspective view illustrating the cylindrical structure according to the embodiment of the invention.

The fixing member 30 has a function of fixing the end piece 12e and the end piece 13e that are positioned in one end of the wire restricting member 10 where the retaining piece 14 and the positioning rib 15 are provided and fixing one end portion of the cylindrical member 20 in a longitudinal direction. The fixing member 30 accommodates the end piece 12e and the end piece 13e of the wire restricting member 10 and the one end portion of the cylindrical member 20 and restricts bending of the wire restricting member 10 and the cylindrical member 20 in the fixing member 30. Further, by pressing the fixing member 30 to hold the wire restricting member 10 and the cylindrical member 20 in the fixing member 30, the wire restricting member 10 and the cylindrical member 20 are fixed to the fixing member 30. Hereinafter, a structure of the fixing member 30 will be described in detail.

The fixing member 30 is formed of two half bodies including a lower housing 40 and an upper housing 50. The lower housing 40 and the upper housing 50 have the common structure except for a partial structure. Here, first, the structure of the lower housing 40 will be described in detail. The lower housing 40 is formed in a hollow semi-spherical shape as a whole as illustrated in FIGS. 10 and 11, and two planes parallel to each other are cut as illustrated in FIG. 12 such that a front end and a rear end are removed. The lower housing 40 having the above-described shape includes a front fixing portion 41, a rear fixing portion 42, a locking convex portion 43, and a locking concave portion 44.

In the front fixing portion 41, a second joint portion 41a that protrudes upward from a front end surface of the lower housing 40 is formed. In the present embodiment, the second joint portion 41a is a rib 41a. As illustrated in FIGS. 10 and 11, an upper end of the rib 41a is formed in a semi-circular shape. The radius of the semi-circle is substantially equal to or slightly smaller than the radius of an arc that is formed by outer surfaces of the curved pieces 12a and 13a of the wire restricting member 10.

Further, horizontal surfaces 41b and 41c are formed at opposite upper ends of the rib 41a in an arc direction. Among the horizontal surfaces 41b and 41c, the horizontal surface 41b is provided in a position below the horizontal surface 41c, that is, in a lower position than that of the horizontal surface 41c. In addition, in the front fixing portion 41, as illustrated in FIGS. 10 and 12, a step portion 41d that protrudes from the rib 41a toward the rear fixing portion 42 is formed. In the rib 41a that is provided across the front end surface of the lower housing 40, the step portion 41d protrudes from a position that is positioned below the horizontal surface 41b. An upper end of the step portion 41d also forms a horizontal surface.

In the rear fixing portion 42, a rib 42a that horizontally protrudes from a rear end surface of the lower housing 40 is formed. As illustrated in FIGS. 10 and 11, an upper end of the rib 42a is formed in a semi-circular shape. The radius of the semi-circle is substantially equal to or slightly smaller than the radius of an arc that is formed by an outer surface of the cylindrical member 20. In a case where the fixing member 30 is attached to the cylindrical member 20, the rib 42a abuts on an outer surface of the fixing member 30. At this time, the dimension of the rib 42a is substantially equal to or slightly smaller than the radius of the arc that is formed by the outer surface of the cylindrical member 20. In a case where the lower housing 40 and the upper housing 50 are assembled together, the rib 42a presses the cylindrical member 20. As a result, the cylindrical member 20 is fixed to the fixing member 30.

The locking convex portion 43 includes: a locking projecting piece 43a that protrudes from an upper end surface of the lower housing 40; and two guide projecting pieces 43b and 43c that are provided in a front-rear direction of the locking projecting piece 43a such that the locking projecting piece 43a is interposed therebetween, and protrude from the upper end surface of the lower housing 40. In addition, the locking concave portion 44 includes: a locking hole 44a that bores from the upper end surface of the lower housing 40; and two guide holes 44b and 44c that are provided in a front-rear direction of the locking hole 44a such that the locking hole 44a is interposed therebetween, and bore from the upper end surface of the lower housing 40. The locking projecting piece 43a and the locking hole 44a are provided at positions distant from each other, the locking projecting piece 43a and the guide projecting pieces 43b and 43c are positioned on one side in a left-right direction (direction perpendicular to the front-rear direction), and the locking hole 44a and the guide holes 44b and 44c are positioned on the other side in the left-right direction. The upper housing 50 has the same shape as that of the locking projecting piece 43a, the guide projecting pieces 43b and 43c, the locking hole 44a, and the guide holes 44b and 44c (corresponding to a locking projecting piece 53a, guide projecting pieces 53b and 53c, a locking hole 54a, and guide holes 54b and 54c). In a case where the lower housing 40 and the upper housing 50 are assembled together, the locking projecting pieces are guided into the locking holes by the guide projecting pieces and the guide holes such that the locking projecting pieces are engaged with the locking holes and the guide projecting pieces are fitted to the guide holes.

The front fixing portion 41 and the rear fixing portion 42 are positioned on front and rear end surfaces of the lower housing 40, and a cylindrical space having a height in the front-rear direction is formed in the lower housing 40. In this way, the lower housing 40 can accommodate the end piece 12e and the end piece 13e of the wire restricting member 10 and the one end portion of the cylindrical member 20. Plural protrusions 45 are formed on an inner surface of the lower housing 40. The protrusions 45 are provided to press an outer circumferential surface of the cylindrical member 20. Assuming that a corrugate tube is used as the cylindrical member 20, by inserting the protrusions 45 into concave portions among corrugated convex and concave portions formed on an outer surface of the corrugate tube, a stronger pressing force can be applied to the cylindrical member 20. As a result, the cylindrical member 20 is more strongly fixed to the fixing member 30.

Next, the structure of the upper housing 50 will be described in detail. As described above, the upper housing 50 and lower housing 40 have the common structure the except for a partial structure. Therefore, in the description of the structure of the upper housing 50, the same structures are represented by changing the tens digit number of reference numbers from 4 to 5.

In the front fixing portion 51, a second joint portion 51a that protrudes upward from a front end surface of the upper housing 50 is formed. In the present embodiment, the second joint portion 51a is a rib 51a. As illustrated in FIG. 13, a lower end of the rib 51a is formed in a semi-circular shape. The radius of the semi-circle is substantially equal to or slightly smaller than the radius of an arc that is formed by outer surfaces of the curved pieces 12a and 13a of the wire restricting member 10. Further, horizontal surfaces 51b and 51c are formed at opposite lower ends of the rib 51a in an arc direction. Regarding the horizontal surfaces 51b and 51c, the horizontal surface 51b is provided in a position above the horizontal surface 51c, that is, in an upper position than that of the horizontal surface 51c. In addition, in the front fixing portion 51, as illustrated in FIG. 15, a step portion 51d that protrudes from the rib 51a toward the rear fixing portion 52 is formed. In the rib 51a that is provided across the front end surface of the upper housing 50, the step portion 51d protrudes from a position that is positioned above the horizontal surface 51b. An upper end of the step portion 51d also forms a horizontal surface.

In the rear fixing portion 52, a rib 52a that horizontally protrudes from a rear end surface of the upper housing 50 is formed. As illustrated in FIG. 14, a lower end of the rib 52a is formed in a semi-circular shape. The radius of the semi-circle is substantially equal to or slightly smaller than the radius of an arc that is formed by an outer surface of the cylindrical member 20. In a case where the fixing member 30 is attached to the cylindrical member 20, the rib 52a abuts on an outer surface of the fixing member 30. At this time, the dimension of the rib 52a is substantially equal to or slightly smaller than the radius of the arc that is formed by the outer surface of the cylindrical member 20. In a case where the lower housing 40 and the upper housing 50 are assembled together, the rib 52a presses the cylindrical member 20. As a result, the cylindrical member 20 is fixed to the fixing member 30.

The locking convex portion 53 includes: a locking projecting piece 53a that protrudes from a lower end surface of the upper housing 50; and two guide projecting pieces 53b and 53c that are provided in a front-rear direction of the locking projecting piece 53a such that the locking projecting piece 53a is interposed therebetween, and protrude from the lower end surface of the upper housing 50. In addition, the locking concave portion 54 includes: a locking hole 54a that bores from the lower end surface of the upper housing 50; and two guide holes 54b and 54c that are provided in a front-rear direction of the locking hole 54a such that the locking hole 54a is interposed therebetween, and bore from the lower end surface of the upper housing 50. The locking projecting piece 53a and the locking hole 54a are provided at positions distant from each other, the locking projecting piece 53a and the guide projecting pieces 53b and 53c are positioned on one side in a left-right direction (direction perpendicular to the front-rear direction), and the locking hole 54a and the guide holes 54b and 54c are positioned on the other side in the left-right direction. In a case where the lower housing 40 and the upper housing 50 are assembled together, the locking projecting pieces are guided into the locking holes by the guide projecting pieces and the guide holes such that the locking projecting pieces are engaged with the locking holes and the guide projecting pieces are fitted to the guide holes.

The front fixing portion 51 and the rear fixing portion 52 are positioned on front and rear end surfaces of the upper housing 50, and a cylindrical space having a height in the front-rear direction is formed in the upper housing 50. In this way, the upper housing 50 can accommodate the end piece 12e and the end piece 13e of the wire restricting member 10 and the one end portion of the cylindrical member 20. Plural protrusions 55 are formed on an inner surface of the upper housing 50. The protrusions 55 are provided to press an outer circumferential surface of the cylindrical member 20. Assuming that a corrugate tube is used as the cylindrical member 20, by inserting the protrusions 55 into concave portions among corrugated convex and concave portions formed on an outer surface of the corrugate tube, a stronger pressing force can be applied to the cylindrical member 20. As a result, the cylindrical member 20 is more strongly fixed to the fixing member 30.

Further, in the upper housing 50, as illustrated in FIGS. 13 and 14, a cylindrical projecting column 56 is projected on the uppermost portion of the outer surface. In the lower housing 40, a cylindrical projecting column 46 is projected on the deepest portion of the outer surface although the projecting column 46 cannot be seen in the view direction in FIGS. 10 to 12. Regarding this point, the configuration of the projecting column 46 of the lower housing 40 can be understood by referring to the projecting column 56 illustrated in FIGS. 13 to 15. The functions of the projecting columns 46 and 56 will be described below. Here, the projecting column 46 is formed on the deepest portion of the lower housing 40, and the projecting column 56 is formed on the uppermost portion of the upper housing 50. However, the positions of the projecting columns 46 and 56 are not particularly limited as long as they are vertically symmetrical to each other.

Next, a structure in which the lower housing 40 and the upper housing 50 are assembled together will be described. As illustrated in FIG. 16, in a case where the lower housing 40 and the upper housing 50 are assembled together, the locking convex portion 43 and the locking concave portion 44 are engaged with the corresponding locking concave portion 54 and the corresponding locking convex portion 53 of the upper housing 50. In this way, a state where the lower housing 40 and the upper housing 50 are assembled together is maintained.

In addition, in a case where the rib 41a of the lower housing 40 and the rib 51a of the upper housing 50 are seen, the horizontal surfaces 41b and 51b are distant from each other, and the horizontal surfaces 41c and 51c abut. The connecting projection 15b of the wire restricting member 10 is fitted to a space interposed between the horizontal surfaces 41b and 51b. This point will be described in detail while referring to the procedure of a method of manufacturing a cylindrical structure 1 according to the embodiment of the invention. As illustrated in FIG. 17, in a case where the fixing member 30 is attached to the cylindrical member 20 into which the wire restricting member 10 is inserted, the one end portion of the wire restricting member 10 in the longitudinal direction is exposed without being accommodated in the cylindrical member 20, and the other portions of the wire restricting member 10 are accommodated in the cylindrical member 20. In this state, the lower housing 40 and the upper housing 50 are assembled to the one end portion of the wire restricting member 10 and the cylindrical member 20 from an up-down direction such that the lower housing 40 and the upper housing 50 accommodate the one end portion of the wire restricting member 10 and the cylindrical member 20. At this time, in a case where the lower housing 40 moves to the wire restricting member 10 such that the horizontal surface 41b of the rib 41a enters one of the recesses 15c of the connecting projection 15b, the horizontal surface 41b abuts on one of the aligning surfaces 15d of the connecting projection 15b. Further, in a case where the upper housing 50 moves to the wire restricting member 10 such that the horizontal surface 51b of the rib 51a enters the other one of the recesses 15c of the connecting projection 15b, the horizontal surface 51b abuts on the other one of the aligning surfaces 15d of the connecting projection 15b. At this time, the step portions 41d and 51d abut on the aligning surfaces 15e of the circumferential projection 15a. In this way, the wire restricting member 10 is positioned relative to the fixing member 30, and the circumferential projection 15a and the connecting projection 15b are pressed against and interposed between the two aligning surfaces 15d and the two aligning surfaces 15e, respectively. As a result, the wire restricting member 10 is fixed to the fixing member 30.

In addition, in a case where the lower housing 40 and the upper housing 50 are assembled together, the cylindrical member 20 is pressed against and interposed between the ribs 42a and 52a. In addition, the cylindrical member 20 is pressed against and interposed between the protrusions 45 and 55 with a stronger force. As a result, the cylindrical member 20 is fixed to the fixing member 30.

In this way, the cylindrical structure 1 according to the embodiment of the invention to which the wire restricting member 10 and the cylindrical member 20 are fixed through the fixing member 30 is formed. Hereinafter, the operation and effect of the cylindrical structure 1 will be described.

As illustrated in FIG. 9, the wire restricting member 10 allows only bending during which the bottom plate 11a is positioned inside and the openings are positioned outside. Other forms of bending are restricted by the bottom plate 11a, the restricting piece 12b, and the restricting piece 13b. Specifically, bending during which the bottom plate 11a is positioned outside and the openings are positioned inside (bending opposite to the bending of the wire restricting member 10 illustrated in FIG. 9) is restricted by abutting the restricting pieces 12b and the end pieces 12e adjacent to each other and abutting the restricting piece 13b and the end pieces 13e adjacent to each other. In addition, bending during which the restricting pieces 12b and the restricting pieces 13b are positioned inside or outside (bending of the wire restricting member 10 in a depth direction or a front direction of FIG. 9) is restricted by the bottom plate 11a. In this way, the wire restricting member 10 allows only bending during which the bottom plate 11a is positioned inside and the openings are positioned outside. In other words, it can be said that the wire restricting member 10 allows bending on a plane perpendicular to the left-right direction (direction in which the right side plate portion 12 and the left side plate portion 13 face each other), that is, two-dimensional bending. By allowing this two-dimensional bending, bending stress applied to electric wire accommodated in the wire restricting member 10 is reduced compared to a case where three-dimensional bending is allowed. As a result, the durability life of the electric wire can be improved. The wire restricting member 10 may bent in a direction other than the above-described four directions. In a case where components of a bending direction of the bending is separated into the four directions, a component of only one direction (component in which the bottom plate 11a is bent inside and the openings are bent outside) is allowed.

In addition, the wire restricting member 10 restricts the cylindrical member 20 from the inside. Therefore, regarding the shape of the cylindrical member 20 as an exterior material, an inner diameter is required to the extent that the cylindrical member 20 can accommodate the wire restricting member 10, but a limitation on the outer surface is suppressed. Therefore, the design freedom of the cylindrical member 20 is improved. On the other hand, since the wire restricting member 10 is accommodated in the cylindrical member 20, an operator cannot see the wire restricting member 10 unless the cylindrical member 20 is formed of a transparent material. Therefore, it may be difficult to determine a positional relationship of the wire restricting member 10 in the cylindrical member 20, and it may be difficult to determine a direction in which the wire restricting member 10 is bendable. For example, a method of seeing, in a case where the wire restricting member 10 is accommodated in the cylindrical member 20, the inside of the cylindrical member 20 to recognize the positions of the openings of the wire restricting member 10, and marking the positions on the cylindrical member 20 may also be considered. However, in this method, a load on the operator is generally large. Under this circumstance, the fixing member 30 functions to recognize the positional relationship of the wire restricting member 10 in the cylindrical member 20.

That is, in a case where the wire restricting member 10 is fixed to the fixing member 30, the wire restricting member 10 is positioned relative to the fixing member 30 by the horizontal surface 41b of the lower housing 40 and the horizontal surface 51b of the upper housing 50. Therefore, by seeing the fixing member 30, a direction in which the wire restricting member 10 is bendable can be recognized immediately. Alternatively, as illustrated in FIG. 17, the fixing member 30 is in a state where the retaining piece 14 of the wire restricting member 10 is exposed. Therefore, by seeing the retaining piece 14, a direction in which the wire restricting member 10 is bendable can be recognized immediately. The cylindrical structure 1 where a direction in which the wire restricting member 10 is bendable can be recognized contributes to the improvement of workability in a case where the cylindrical structure 1 is disposed on an assembly member described below.

In addition, in a case where the fixing member 30 is assembled into the wire restricting member 10, an operator can move the horizontal surface 41b of the lower housing 40 or the horizontal surface 51b of the upper housing 50 close to the wire restricting member 10 by using the recess 15c of the wire restricting member 10 as a mark. At this time, in a case where the surfaces are correctly moved close to the member, the operator can obtain a mounting feeling from the locking convex portion and the locking concave portion of the lower housing 40 and the upper housing 50. Therefore, the operator can easily determine whether or not the fixing member 30 is appropriately assembled into the wire restricting member 10. In the description of the embodiment of the invention, the recess 15c functions as a structure for positioning in the wire restricting member 10, and the ribs 41a and 51a function as a structure for positioning in the fixing member 30. The invention is not limited to this structure. Any structure can be adopted as long as a concave portion or a convex portion is formed on the outer surface of the wire restricting member 10 and a convex portion or a concave portion is provided at a position corresponding to the concave portion or the convex portion on the inner surface of the fixing member 30. In addition, the fixing member 30 is divided into two half bodies (the lower housing 40, the upper housing 50), and the ribs 41a and 51a provided in the two half bodies, respectively, enter the recesses 15c of the wire restricting member 10. The invention is not limited to this structure. A space interposed between the horizontal surfaces 41b and 51b may be formed in a rib of either the lower housing 40 or the upper housing 50. With this structure, the positioning of the wire restricting member 10 relative to the fixing member 30 is finished by the mounting of one housing. In addition, the recess 15c is provided as a concave portion in the wire restricting member 10, and the ribs 41a and 51a are provided as a convex portion in the fixing member 30. It is needless to say that, even in a case where the relationship between the concave portion and the convex portion is reversed, the desired effect can be obtained.

Figure 18:
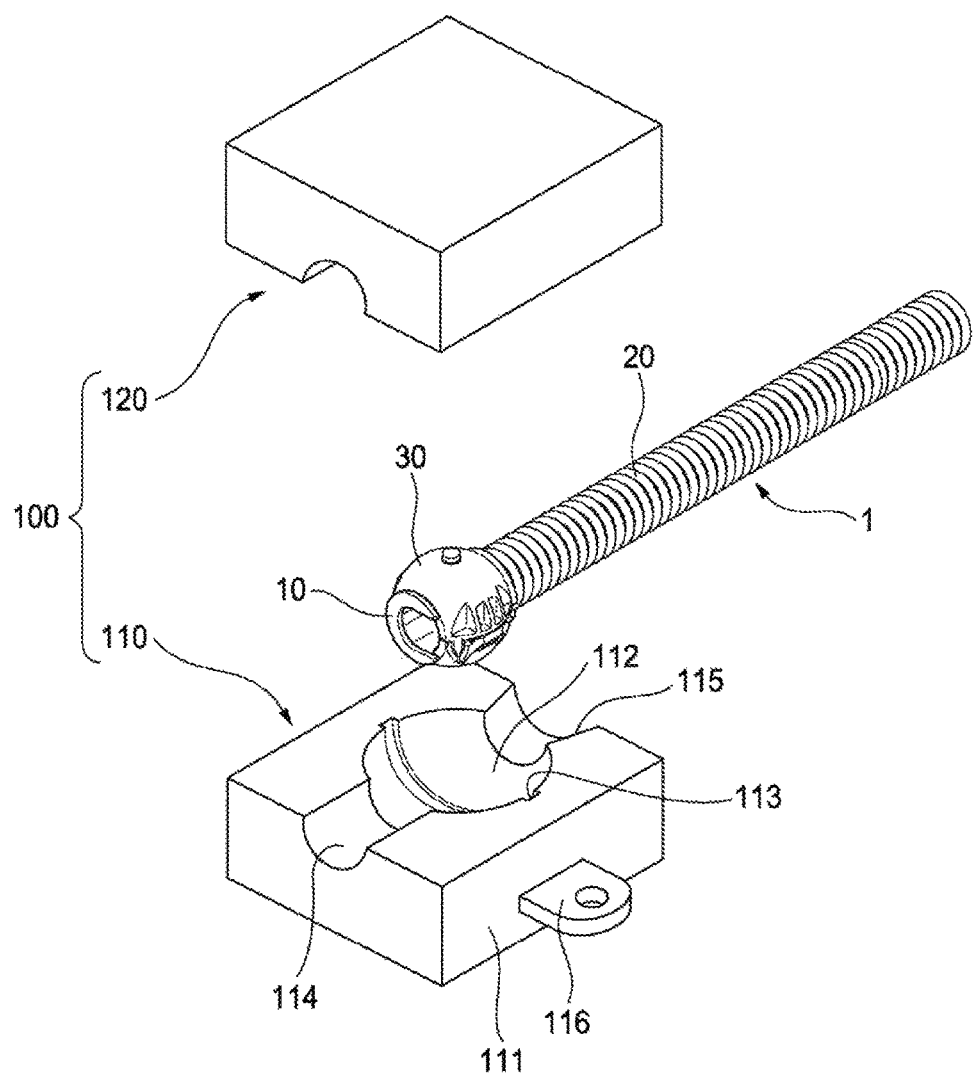
FIG. 18 is an exploded perspective view illustrating a routing structure according to the embodiment of the invention.
Figure 19:
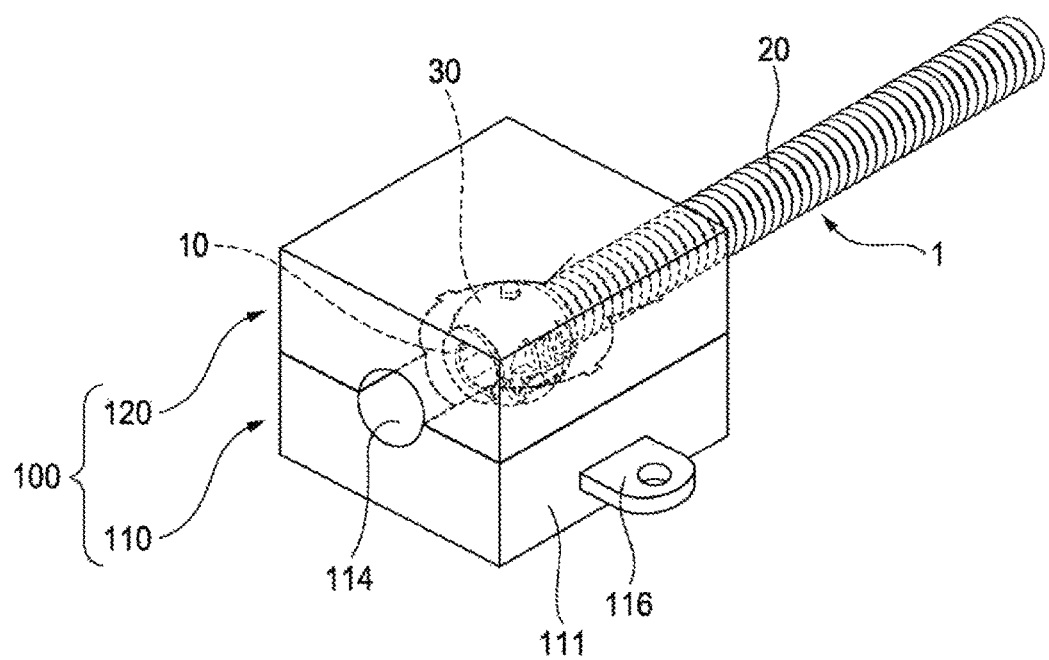
FIG. 19 is a perspective view illustrating the routing structure according to the embodiment of the invention.

Hereinabove, the cylindrical structure 1 according to the embodiment of the invention has been described in detail. Next, a structure of an assembly member 100 for assembling the cylindrical structure 1 into a vehicle, and a bending operation of the cylindrical structure 1 assembled into the vehicle will be described. FIG. 18 is an exploded perspective view illustrating a routing structure according to the embodiment of the invention. FIG. 19 is a perspective view illustrating the routing structure according to the embodiment of the invention. The routing structure according to the embodiment of the invention is configured of the cylindrical structure 1 and the assembly member 100.

As described in "Operation and Effect of Cylindrical Structure 1", the wire restricting member 10 allows bending on a plane perpendicular to the left-right direction (direction in which the right side plate portion 12 and the left side plate portion 13 face each other). In a case where the cylindrical structure 1 including the wire restricting member 10 is assembled into a vehicle body frame or a sliding door, the structure of the assembly member 100 interposed between the cylindrical structure 1 and the vehicle body frame or the sliding door is important.

Before describing the routing structure according to the embodiment of the invention in detail, a routing structure of the related art in which a wiring harness applicable to a sliding door is routed in a vehicle will be described. In electric wire used in the routing structure of the related art and an exterior part that accommodates the electric wire, it is necessary to allow three-dimensional bending. That is, depending on vehicles, an installation position of one end of electric wire installed in a vehicle body frame through an exterior part is different from an installation position of another end of the electric wire installed in a sliding door through an exterior part. Depending on vehicles, the ground height of one end of the electric wire may be different from the ground height of another end of the electric wire. In a case where the ground heights are the same, the electric wire is bent only on a horizontal plane during the opening and closing of the sliding door. However, in a case where the ground heights are different from each other, the electric wire is necessary to be bent not only on a horizontal plane but also on a vertical plane during the opening and closing of the sliding door. In this way, in the related art, a difference in ground height is tolerated by the bending of the electric wire. Under this circumstance, in a case where the versatility of a wiring harness applied to a sliding door progresses, three-dimensional bending of the electric wire of the related art is necessary to be allowed in order to deal with a difference in ground height.

On the other hand, the wire restricting member 10 allows the two-dimensional bending. Only with a configuration in which one end or another end of the wire restricting member 10 restricted to the two-dimensional bending is simply fixed to a vehicle body frame or a sliding door, it is difficult to deal with a difference in ground height. Therefore, in a case where the cylindrical structure 1 including the wire restricting member 10 is assembled into a vehicle body frame or a sliding door, the structure of the assembly member 100 interposed between the cylindrical structure 1 and the vehicle body frame or the sliding door is important.

The assembly member 100 is configured of a lower exterior body 110 and an upper exterior body 120. The lower exterior body 110 and the upper exterior body 120 have a common structure for accommodating the cylindrical structure 1. Therefore, here, the lower exterior body 110 will be described in detail. The lower exterior body 110 includes a base 111, a spherical hole 112, a circumferential groove 113, a wire accommodation groove 114, a cylinder accommodation groove 115, and a bracket 116.

The base 111 is a housing in which the semi-spherical hole 112, the circumferential groove 113, the wire accommodation groove 114, the cylinder accommodation groove 115, and the bracket 116 are formed. In FIG. 18, the base 111 is illustrated in a rectangular shape as a whole, which is a simplified shape of the structure of the assembly member 100. An actual exterior part installed in a vehicle may have various shapes depending on routing environments in which the exterior part is installed in a vehicle body frame or a sliding door. Therefore, the assembly member 100 according to the invention may also have various shapes.

The spherical hole 112 is a spherical hole that is bored on an upper surface of the base 111. The spherical hole 112 has a dimension as a whole to the extent that the spherical fixing member 30 is accommodated. In a case where the cylindrical structure 1 is mounted on the assembly member 100, the lower housing 40 is accommodated in the spherical hole 112.

The circumferential groove 113 is a groove that is bored along a surface of the spherical hole 112. The circumferential groove 113 is provided on a surface of the spherical hole 112 so as to go around an axis passing through the wire accommodation groove 114 and the cylinder accommodation groove 115. In addition, the circumferential groove 113 is provided in a position passing through the deepest position of the spherical hole 112. In a case where the cylindrical structure 1 is mounted on the assembly member 100, the projecting columns 46 and 56 of the fixing member 30 are accommodated in the circumferential groove 113. Therefore, the groove depth of the circumferential groove 113 is equal to or slightly deeper than the projection height of the projecting columns 46 and 56 of the fixing member 30.

The wire accommodation groove 114 is a groove in which a semi-cylindrical space communicating with the spherical hole 112 is bored on the upper surface of the base 111. The wire accommodation groove 114 is positioned opposite to the cylinder accommodation groove 115 with the spherical hole 112 interposed therebetween. The wire accommodation groove 114 is bored such that a height direction of the semi-cylindrical space matches an axis passing through the wire accommodation groove 114 and the cylinder accommodation groove 115. In a case where the cylindrical structure 1 is mounted on the assembly member 100, electric wire exposed from the ribs 41a and 51a of the fixing member 30 is accommodated in the wire accommodation groove 114.

The cylinder accommodation groove 115 is a groove in which a conical space communicating with the spherical hole 112 is bored on the upper surface of the base 111. The cylinder accommodation groove 115 is positioned opposite to the wire accommodation groove 114 with the spherical hole 112 interposed therebetween. The cylinder accommodation groove 115 is bored such that a height direction of the conical space matches an axis passing through the wire accommodation groove 114 and the cylinder accommodation groove 115. The cylinder accommodation groove 115 has a conical shape in which the diameter of the space increases in a direction away from the spherical hole 112. In a case where the cylindrical structure 1 is mounted on the assembly member 100, the cylindrical member 20 is accommodated in the cylinder accommodation groove 115.

The bracket 116 is a member having a strip shape that extends from the base 111 and in which a screw hole penetrates in an up-down direction is formed. By matching the screw hole of the bracket 116 to a screw hole formed in a vehicle body frame and fastening the bracket 116 and the vehicle body frame with a screw, the bracket 116 is fixed to the vehicle body frame. As a result, the lower exterior body 110 is fixed to the vehicle body frame.

Hereinafter, the structure of the lower exterior body 110 will be described. Since the upper exterior body 120 has the same shape as that of the lower exterior body 110 except that the bracket 116 is not formed, the description thereof will not be made.

In a case where the cylindrical structure 1 is assembled into the assembly member 100, the lower housing 40 and the upper housing 50 are accommodated in the spherical hole 112, the projecting columns 46 and 56 of the fixing member 30 are accommodated in the circumferential groove 113, electric wire that is exposed and protrudes from the ribs 41a and 51a of the fixing member 30 is accommodated in the wire accommodation groove 114, and the cylinder member 20 is accommodated in the cylinder accommodation groove 115. The cylindrical structure 1 into which the assembly member 100 is assembled can rotate around an axial center of the wire restricting member 10 as a central axis by the projecting columns 46 and 56 being guided into the circumferential groove 113. In addition, the cylindrical structure 1 can rotate around a line segment connecting the two projecting columns 46 and 56 as a central axis by the two projecting columns 46 and 56 functioning as supporting points (in order to allow this rotation, the cylindrical cylinder accommodation groove 115 has a conical shape in which the diameter of the space increases in a direction away from the spherical hole 112). In this way, the cylindrical structure 1 can rotate three-dimensionally by being assembled into the assembly member 100.

In a case where an external force is applied to the cylindrical structure 1 assembled into the assembly member 100, the cylindrical structure 1 rotates around the axial center of the wire restricting member 10 as a central axis and rotates around the line segment connecting the projecting columns 46 and 56 as a central axis toward a position where the external force can be most efficiently released. In other words, the cylindrical structure 1 rotates toward a position where most of the external force applied to the cylindrical structure 1 is used for bending of the wire restricting member 10 during which the bottom plate 11a is positioned inside and the openings are positioned outside. Hereinafter, with the routing structure according to the embodiment of the invention, the cylindrical structure 1 and the assembly member 100 cooperate together such that three-dimensional bending of the cylindrical member 20 can be realized and the versatility of a wiring harness applied to a sliding door can be realized.

Further, in the description of the embodiment of the invention, the six restricting pieces 12b and the six restricting pieces 13b are provided in the wire restricting member 10, and one restricting piece 12b is adjacent to another restricting piece 12b or the end piece 12e and one restricting piece 13b is adjacent to another restricting piece 13b or the end piece 13e. As a result, bending can be restricted across the entire length of the wire restricting member 10. However, there may be a portion where restriction of bending is not desired. In this case, the portion bending is not restricted can be provided by removing the curved pieces 12a and 13a and the restricting pieces 12b and 13b from the portion and forming the bottom plate 11a of the portion in a rod shape. This configuration is useful in a case where the wire restricting member 10 is long.

In the description of the routing structure according to the embodiment of the invention, the cylindrical structure 1 rotates around both the axial center of the wire restricting member 10 and the line segment connecting the projecting columns 46 and 56 as central axes. However, a configuration where the cylindrical structure 1 rotates around either the axial center of the wire restricting member 10 or the line segment connecting the projecting columns 46 and 56, also contributes to realization of three-dimensional bending of the cylindrical member 20. The configuration in which the cylindrical structure 1 rotates around both the axial center of the wire restricting member 10 and the line segment connecting the projecting columns 46 and 56 as central axes more contributes to realization of three-dimensional bending of the cylindrical member 20.

Here, the characteristics of the embodiment of the wire restricting member, the cylindrical structure, the routing structure, and the method of manufacturing a cylindrical structure according to the invention will be collectively and briefly described in the following [1] to [7].

[1] A wire restricting member (10) including:
a bottom plate portion (11); and
a pair of side plate portions (right side plate portion 12, left side plate portion 13) which vertically extend from opposite ends of the bottom plate portion (11) along a longitudinal direction of the bottom plate portion (11), respectively, wherein
upper ends of the side plate portions in a direction in which the side plate portions (right side plate portion 12, left side plate portion 13) vertically extend are distant from each other to form an opening therebetween, and each of the side plate portions (right side plate portion 12, left side plate portion 13) includes a notch (12c, 13c) which is cut from each of the upper ends to the bottom plate portion (11).

[2] A cylindrical structure (1) including:
the wire restricting member (10) according to [1]; and
a cylindrical member (20) which accommodates a part of the wire restricting member (10), wherein
one end portion (end pieces 12e, 13e) of the wire restricting member (10) in a longitudinal direction and one end portion of the cylindrical member (20) in the longitudinal direction are fixed to each other,
the one end portion (end pieces 12e, 13e) of the wire restricting member (10) is disposed at outside of the cylindrical member (20), and
the one end portion of the cylindrical member (20) is positioned on a side where the one end portion (end pieces 12e, 13e) of the wire restricting member (10) is disposed.

[3] The cylindrical structure (1) according to [2], further including:
a fixing member (30) which fixes the one end portion (end pieces 12e, 13e) of the wire restricting member (10) and accommodates the one end portion (end pieces 12e, 13e) of the wire restricting member (10) and the one end portion of the cylindrical member (20) therein.

[4] The cylindrical structure (1) according to [3], wherein
a first joint portion, which is a concave or a convex (recess 15c), is formed on an outer surface of either the bottom plate portion (11) or the side plate portions (right side plate portion 12, left side plate portion 13) in the one end portion (end pieces 12e, 13e) of the wire restricting member (10), and
a second joint portion, which is a convex or a concave (ribs 41a, 51a), is formed at a position corresponding to the first joint portion (recess 15c) in an inner surface of the fixing member (30) that faces the outer surface of the one end portion (end pieces 12e, 13e) of the wire restricting member (10).

[5] The cylindrical structure (1) according to [3], wherein
two first joint portions, each of which is a concave or a convex (recess 15c), are formed on an outer surface of the wire restricting member (10) in the one end portion (end pieces 12e, 13e) of the wire restricting member (10),
the fixing member includes a first half body and a second half body (lower housing 40, upper housing 50), and is formed with two joint portions (ribs 41a, 51a) each of which is a concave or a convex,
one of the second joint portions (rib 41a) is formed at a position corresponding to one of the first joint portions (recess 15c) in an inner surface of the first half body (lower housing 40) that faces the outer surface of the one end portion (end pieces 12e, 13e) of the wire restricting member (10), and
the other one of the second joint portions (rib 51a) is formed at a position corresponding to the other one of the first joint portions (recess 15c) in an inner surface of the second half body (upper housing 50) that faces the outer surface of the one end portion (end pieces 12e, 13e) of the wire restricting member (10).

[6] A routing structure including:
the cylindrical structure (1) according to [3]; and
an assembly member (100) configured to assemble the cylindrical structure (1) to a vehicle body, wherein
the fixing member (30) includes a fixing member main body (lower housing 40, upper housing 50) and a projection portion (projecting columns 46, 56) formed on an outer surface of the fixing member main body (lower housing 40, upper housing 50),
the fixing member main body (lower housing 40, upper housing 50) accommodates the one end portion of the wire restricting member (10) and the one end portion of the cylindrical member (20),
the outer surface of the fixing member main body (lower housing 40, upper housing 50) is formed in a spherical shape as a whole,
the assembly member (100) includes an assembly member main body (base 111) and a groove portion (circumferential groove 113),
the assembly member main body (base 111) has a spherical accommodation space (spherical hole 112) that accommodates the fixing member main body (lower housing 40, upper housing 50),
the groove portion (circumferential groove 113), is bored on a surface of the assembly member main body (base 111) facing the accommodation space (spherical hole 112), and extends along a circumferential direction that is perpendicular to a longitudinal direction of the cylindrical member (20) extending from the fixing member main body (lower housing 40, upper housing 50), and
the projection portion (projecting columns 46, 56) is fitted to the groove portion (circumferential groove 113) in a state where the fixing member main body (lower housing 40, upper housing 50) is accommodated in the assembly member main body (base 111).

[7] A method of manufacturing a cylindrical structure, including:
inserting a wire restricting member (10) into a cylindrical member (20), the wire restricting member (10) including a bottom plate portion (11) and a pair of side plate portions (right side plate portion 12, left side plate portion 13), the side plate portions (right side plate portion 12, left side plate portion 13) which vertically extend from opposite ends of the bottom plate portion (11) along a longitudinal direction of the bottom plate portion (11), respectively, and in which upper ends of the side plate portions (right side plate portion 12, left side plate portion 13) in a direction in which the side plate portions (right side plate portion 12, left side plate portion 13) vertically extend are distant from each other to form an opening therebetween, and each of the side plate portions (right side plate portion 12, left side plate portion 13) including a notch (12c, 13c) which is cut from each of the upper ends to the bottom plate portion (11); and
covering and fixing, by a fixing member (30), one end portion (end piece 12e, 13e) of the wire restricting member (10) in the longitudinal direction and one end portion of the cylindrical member (20) in the longitudinal direction, the one end portion (end piece 12e, 13e) of the wire restricting member (10) being disposed at outside of the cylindrical member (20), and the one end portion of the cylindrical member (20) being positioned on a side where the one end portion (end piece 12e, 13e) of the wire restricting member (10) is disposed.

The wire restricting member allows bending on a plane perpendicular to a left-right direction (direction in which the pair of side plate portions face each other), that is, two-dimensional bending. By allowing this two-dimensional bending, bending stress applied to electric wire accommodated in the wire restricting member is reduced compared to a case where three-dimensional bending is allowed.

In the cylindrical structure, the wire restricting member restricts the cylindrical member from the inside. Therefore, regarding the shape of the cylindrical member as an exterior material, an inner diameter is required to the extent that the cylindrical member can accommodate the wire restricting member, but a limitation on the outer surface is suppressed. Therefore, the design freedom of the cylindrical member is improved.

In the cylindrical structure, in a case where the wire restricting member is fixed to the fixing member, the wire restricting member is positioned relative to the fixing member. Therefore, in a case of seeing the fixing member, a direction in which the wire restricting member accommodated in the cylindrical member is bendable can be recognized immediately.

In the cylindrical structure, the fixing member is formed of two half bodies. As a result, the wire restricting member and the cylindrical member can be easily accommodated in the fixing member.

In the routing structure, the cylindrical structure and the assembly member cooperate with each other such that three-dimensional bending of the cylindrical member can be realized and the versatility of a wiring harness applied to a sliding door can be realized.

In the method of manufacturing a cylindrical structure, the wire restricting member allows bending on a plane perpendicular to a left-right direction (direction in which the pair of side plate portions face each other), that is, two-dimensional bending. By allowing this two-dimensional bending, bending stress applied to electric wire accommodated in the wire restricting member is reduced compared to a case where three-dimensional bending is allowed.

In the wire restricting member, the cylindrical structure including the wire restricting member, the routing structure including the cylindrical structure, and the method of manufacturing the cylindrical structure according to the invention, a restricting member having versatility in restricting a bending direction of electric wire can be provided.

What is claimed is:

1. A cylindrical structure comprising:
   a wire restricting member comprising:
   a bottom plate portion; and
   a pair of side plate portions which vertically extend from opposite ends of the bottom plate portion along a longitudinal direction of the bottom plate portion, respectively,
   wherein upper ends of the side plate portions in a direction in which the side plate portions vertically extend are distant from each other to form an opening therebetween, and
   wherein each of the side plate portions includes a notch which is cut from each of the upper ends to the bottom plate portion; and
   a cylindrical member which accommodates a part of the wire restricting member, wherein
   one end portion of the wire restricting member in a longitudinal direction and one end portion of the cylindrical member in the longitudinal direction are fixed to each other,
   the one end portion of the wire restricting member is disposed outside of the cylindrical member, and
   the one end portion of the cylindrical member is positioned on a side where the one end portion of the wire restricting member is disposed.

2. The cylindrical structure according to claim 1, further comprising:
   a fixing member which fixes the one end portion of the wire restricting member and accommodates the one end portion of the wire restricting member and the one end portion of the cylindrical member therein.

3. The cylindrical structure according to claim 2, wherein
   a first joint portion, which is concave or convex, is formed on an outer surface of either the bottom plate portion or the side plate portions in the one end portion of the wire restricting member, and
   a second joint portion, which is convex or concave, is formed at a position corresponding to the first joint portion in an inner surface of the fixing member that faces the outer surface of the one end portion of the wire restricting member.

4. The cylindrical structure according to claim 2, wherein
   two first joint portions, each of which is concave or convex, are formed on an outer surface of the wire restricting member in the one end portion of the wire restricting member,
   the fixing member includes a first half body and a second half body, and is formed with two second joint portions each of which is concave or convex,
   one of the second joint portions is formed at a position corresponding to one of the first joint portions in an inner surface of the first half body that faces the outer surface of the one end portion of the wire restricting member, and
   the other one of the second joint portions is formed at a position corresponding to the other one of the first joint portions in an inner surface of the second half body that faces the outer surface of the one end portion of the wire restricting member.

5. A routing structure comprising:
   the cylindrical structure according to claim 2; and
   an assembly member configured to assemble the cylindrical structure to a vehicle body, wherein
   the fixing member includes a fixing member main body and a projection portion formed on an outer surface of the fixing member main body,
   the fixing member main body accommodates the one end portion of the wire restricting member and the one end portion of the cylindrical member,
   the outer surface of the fixing member main body is formed in a spherical shape as a whole,
   the assembly member includes an assembly member main body and a groove portion,
   the assembly member main body has a spherical accommodation space that accommodates the fixing member main body,
   the groove portion, is bored on a surface of the assembly member main body facing the spherical accommodation space, and extends along a circumferential direction that is perpendicular to a longitudinal direction of the cylindrical member extending from the fixing member main body, and
   the projection portion is fitted to the groove portion in a state where the fixing member main body is accommodated in the assembly member main body.

6. A method of manufacturing a cylindrical structure, comprising:
   inserting a wire restricting member into a cylindrical member, the wire restricting member including a bottom plate portion and a pair of side plate portions, the side plate portions vertically extending from opposite ends of the bottom plate portion along a longitudinal direction of the bottom plate portion, respectively, wherein upper ends of the side plate portions in a direction in which the side plate portions vertically extend are distant from each other to form an opening therebetween, and each of the side plate portions includes a notch which is cut from each of the upper ends to the bottom plate portion; and covering and fixing, by a fixing member, one end portion of the wire restricting member in the longitudinal direction and one end portion of the cylindrical member in the longitudinal direction, the one end portion of the wire restricting member being disposed outside of the cylindrical member, and the one end portion of the cylindrical member being positioned on a side where the one end portion of the wire restricting member is disposed.

* * * * *